US010169782B2

(12) United States Patent
Duggal et al.

(10) Patent No.: US 10,169,782 B2
(45) Date of Patent: Jan. 1, 2019

(54) TARGETING ADS ENGAGED BY A USER TO RELATED USERS

(71) Applicant: Adobe Systems Incorporated, San Jose, CA (US)

(72) Inventors: Ashish Duggal, New Delhi (IN); Anmol Dhawan, Uttar Pradesh (IN); Anuj Jain, New Delhi (IN); Sachin Soni, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 204 days.

(21) Appl. No.: 14/540,304

(22) Filed: Nov. 13, 2014

(65) Prior Publication Data

US 2016/0140618 A1    May 19, 2016

(51) Int. Cl.
*G06Q 30/00* (2012.01)
*G06Q 30/02* (2012.01)
*G06Q 50/00* (2012.01)

(52) U.S. Cl.
CPC ......... *G06Q 30/0269* (2013.01); *G06Q 50/01* (2013.01)

(58) Field of Classification Search
None
See application file for complete search history.

(56) References Cited

U.S. PATENT DOCUMENTS

| 8,239,546 | B1* | 8/2012 | McGowan | H04L 65/1069 709/227 |
| 2005/0144073 | A1* | 6/2005 | Morrisroe | G06Q 30/02 705/14.5 |
| 2008/0108308 | A1* | 5/2008 | Ullah | G06Q 30/02 455/41.2 |
| 2009/0171749 | A1* | 7/2009 | Laruelle | G06Q 30/02 705/14.52 |
| 2009/0234711 | A1* | 9/2009 | Ramer | G06F 17/30749 705/14.66 |
| 2010/0030578 | A1* | 2/2010 | Siddique | G06Q 10/0637 705/3 |
| 2010/0169177 | A1* | 7/2010 | Griffith | G03F 17/3089 705/14.53 |
| 2012/0078712 | A1* | 3/2012 | Fontana | G06Q 30/0251 705/14.49 |

(Continued)

OTHER PUBLICATIONS

Luo et al., "You are what you watch and when you watch: inferring household structures from IPTV viewing data", IEEE Transactions on Broadcasting 60:1, Mar. 2014, pp. 61-72.*

*Primary Examiner* — Kambiz Abdi
*Assistant Examiner* — Scott C Anderson
(74) *Attorney, Agent, or Firm* — Keller Jolley Preece

(57) ABSTRACT

The present disclosure is directed toward targeting advertisements to a close-knit group of users. Methods and systems of the present disclosure identify a close-knit group of users or devices based on the use of a concurrent streaming account. The methods and system further include providing an advertisement in conjunction with the content streaming to the devices of the close-knit group to increase the likelihood of a conversion. Optionally, the methods and systems tailor these advertisements based on an age segment of targeted users or based on features engaged by another user of the close-knit group.

20 Claims, 9 Drawing Sheets

(56) References Cited

U.S. PATENT DOCUMENTS

2012/0123830 A1* 5/2012 Svendsen ........... G06Q 30/0252
705/14.5
2015/0026718 A1* 1/2015 Seyller ............... H04N 21/4316
725/34

* cited by examiner

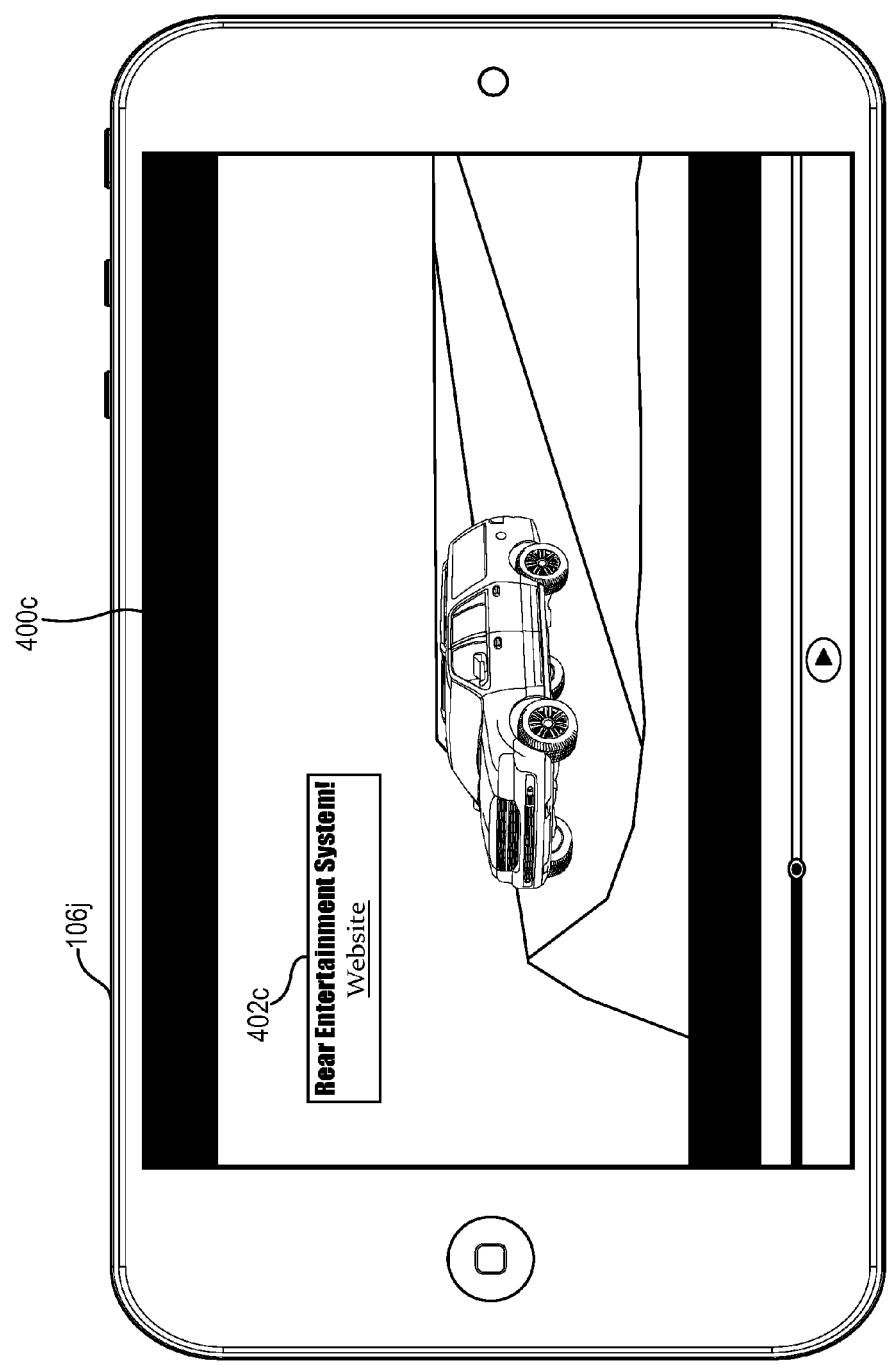

TARGETING ADS ENGAGED BY A USER TO RELATED USERS

BACKGROUND

1. Technical Field

One or more embodiments relate generally to systems and methods for delivering advertising. More specifically, one or more embodiments relate to systems and methods for delivering advertisements to a close-knit group of users.

2. Background and Relevant Art

The Internet is increasingly popular mechanism for delivering content. Content providers commonly use the Internet to provide television, movies, video-on-demand, live sporting events, and other types of video content to client devices over the Internet. Such content often includes digitally inserted advertisements. Typically, advertisers insert advertisements during pre-defined breaks in static content.

Inserting advertisements into live or television style programming includes various challenges. For example, often advertisers may desire to target ads to particular types of users or groups. Targeting advertisements to particular users can be difficult with respect to streaming media due to the need for individualizing ad requests. Individualizing requests can place additional loads on systems managing the insertion of advertising content, thereby increasing the difficulty of scaling the systems to service large audiences. The foregoing problems are typically exacerbated when advertisers attempt to tailor or target ads to individuals within a predefined group. As such, many live or television style programming include ads tailored to the content being delivered but not necessarily to the specific individuals viewing the content.

Additionally, the effectiveness of advertising can depend on a current relevance to the targeted users. Specifically, what may be relevant to a user at a given time may differ depending on the user's wants or needs at the given time. Thus, while targeted advertising is commonly based at least in part on a user's content viewing history, many conventional advertising systems have difficulty providing targeted advertisements in a timely manner to improve the likelihood that the advertisements are relevant to the user's current interests. Timing of advertisements is even more problematic when attempting to target individuals in a predefined group.

These and other disadvantages may exist with respect to tailoring ads in streaming video and tailoring advertisements to pre-defined groups.

SUMMARY

One or more embodiments provide benefits and/or solve one or more of the foregoing or other problems in the art with systems and methods for targeting advertisements to users in a close-knit group. For instance, one or more embodiments involve identifying a close-knit group of users based on common use of a concurrent streaming account. The system and methods described herein can timely target a common advertisement or related advertisements to the users of the close-knit group to increase the likelihood that the close-knit group will discuss or purchase a product or service from the advertisement(s). Optionally, the systems and methods can tailor or customize the advertisement(s) based on an age or other profiles of the users in the close-knit group. Still further, the systems and methods can serve or tailor advertisements to users in the close-knit group based on features engaged by another user in the close-knit group.

For example, one embodiment of a method of targeting advertisements to a close-knit group of users involves determining that several client devices are streaming content using a common concurrent streaming account. The method further involves identifying age profiles for each of the users of the client devices. The method includes providing a version of an advertisement to each client device that is tailored to an age profile of the user of the client device. Thus, the method can server advertisements about a product or service tailored to the individual users in the close-knit group in an effort to increase interest for the product or service in the users in the close-knit group.

Another embodiment of a method targeting advertisements to a close-knit group of users involves determining that a first user has engaged an advertisement in connection with content streaming using a concurrent streaming account. Based on this detected interest, the method can timely serve the same or related advertisements to other users streaming content using the same concurrent streaming account. As such, the method can foster interest in a product or service of interest to one user of a close-knit group in other users in the close-knit group. Furthermore, the method can involve identifying a feature of the product or service from the advertisement that the first user is interested in based on the user engagement with the advertisement. The method can then tailor the advertisement(s) served to the other users in the close-knit group to focus on or highlight the feature that interests the first user.

Additional features and advantages of one or more embodiments of the present disclosure will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features may be obtained, a more particular description of embodiments systems and methods briefly described above will be rendered by reference to specific embodiments thereof that are illustrated in the appended drawings. It should be noted that the Figures are not drawn to scale, and that elements of similar structure or function are generally represented by like reference numerals for illustrative purposes throughout the Figures. Understanding that these drawings depict only typical embodiments and are not therefore to be considered to be limiting of its scope, the systems and methods will be described and explained with additional specificity and detail through the use of the accompanying drawings in which:

FIGS. 4A-4C illustrate advertisements provided on client devices of a close-knit group of users in accordance with one or more embodiments;

DETAILED DESCRIPTION

Figure 1:
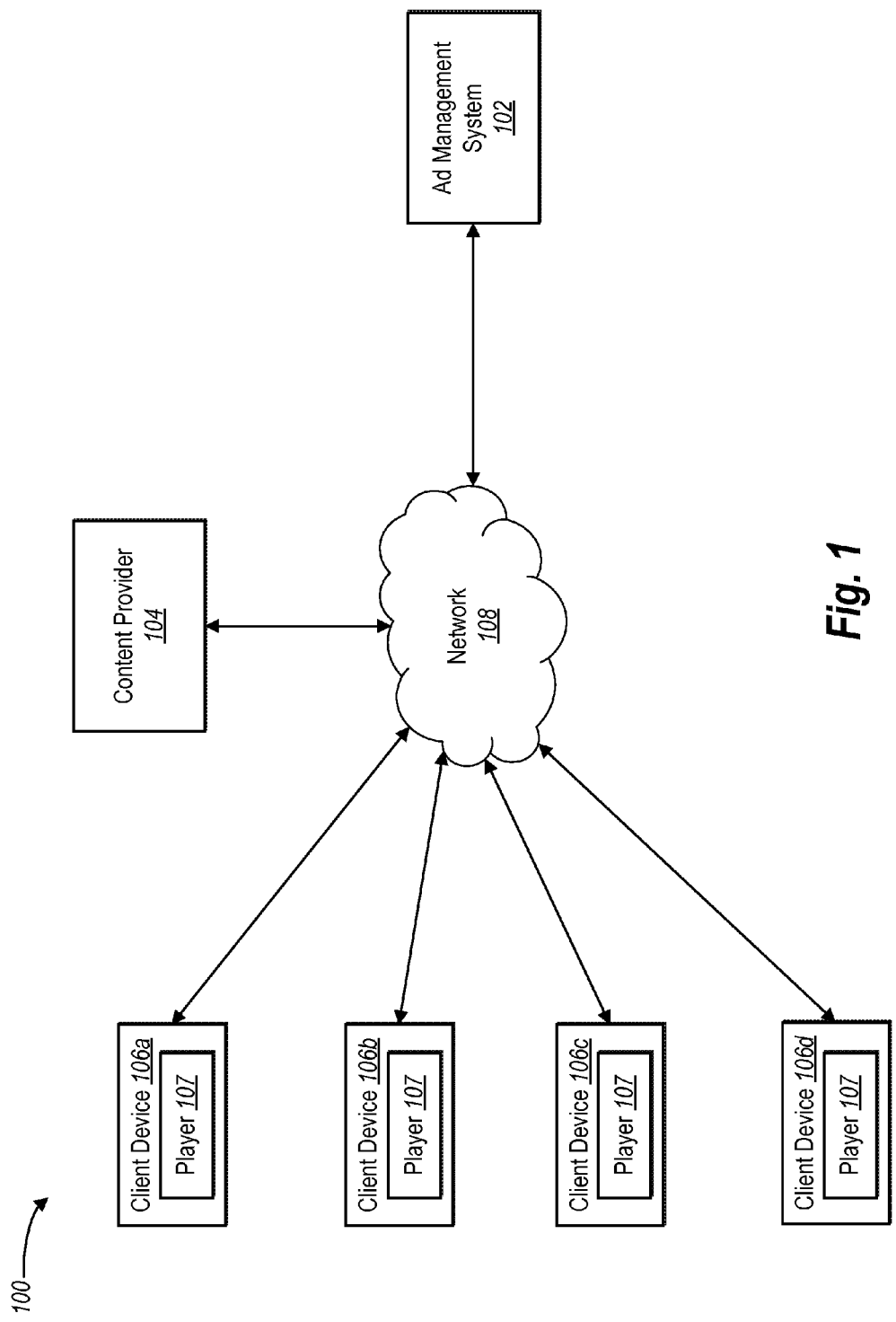
FIG. 1 illustrates a schematic diagram of a system in which an ad management system operates in accordance with one or more embodiments.

The present disclosure is directed towards an ad management system that targets advertisements to users in a close-knit group. For instance, one or more embodiments of the ad management system identify a close-knit group of users based on common use of a concurrent streaming account. The ad management system timely targets a common advertisement or related advertisements to the users of the close-knit group to increase the likelihood that the close-knit group will discuss or purchase a product or service from the advertisement(s). Optionally, the ad management system can tailor or customize the advertisement(s) based on an age or other characteristic of the users in the close-knit group. Still further, the ad management system can serve or tailor advertisements to users in the close-knit group based on features engaged by another user in the close-knit group.

Providing a targeted advertisement to a group of related users allows the ad management system to generate interest in the advertisement among the users in the group. In particular, upon a user engaging an advertisement, the ad management system can send the same or related advertisements to other users in the group. Thus, the ad management system can help simulate interest in product or service in a group of users, thereby increasing the likelihood of conversion. For example, providing each user in a group of users the same or related advertisements in a timely fashion can stimulate conversation about a product or service being advertised. Providing discussion points for users and increasing an amount the users discuss the product or service associated with the advertisement, can increase the likelihood that the users in the group make a purchase.

Furthermore, the ad management system can customize the advertisement based on one or more characteristics of the users in the group. Specifically, the ad management system can identify an age profile (e.g., estimate an age group) for users of the various client devices based on the content that is streamed to the devices. For example, the ad management system can first identify content types that are typically of interest to certain age groups based on statistical data indicating the most common content types that each age group accesses or views. To illustrate, the ad management system can obtain the statistical data about common content types from a content provider associated with the ad management system or from an entity that collects information about the content that one or more groups of users access (e.g., from a ratings entity).

In one or more embodiments, the ad management system can obtain the statistical data prior to identifying different age profiles and/or prior to assigning age profiles to users. The ad management system can then assign age profiles to users of the client devices based on the types and amount of content streamed to the devices. To illustrate, if a particular client device streams content types that are most commonly associated with a certain age group, the ad management system can assign a corresponding age profile to the user of the client device.

Additionally or alternatively, the ad management system can identify other characteristics (e.g., gender, household role) for customizing the advertisement in a similar manner. For example, the ad management system can identify content types that are typically of interest to users with a particular characteristic based on statistical data indicating the most common content types that users with the particular characteristic access or view. The ad management system can then assign characteristic profiles to users of the client devices based on the types and amount of content streamed to the devices. To illustrate, if a particular client device streams content types that are most commonly associated with a certain characteristic (e.g., gender), the ad management system can assign or associate the characteristic with the user of the client device.

After determining age profiles or other characteristics of the user of the client device, the ad management system can customize the advertisement for the user based on the identified age profile or characteristic. For example, the ad management system can select an advertisement that targets specific features of a product that are likely of interest to users with the identified characteristic. To illustrate, upon determining that a first user in a close-knit group is a teenager, the ad management system can select and serve a version of an advertisement that highlights features of the product that statistics or experience indicate typically interests teenagers. Along related lines, upon determining that a second user from the same close-knit group is an adult, the ad management system can select and serve a version of the same advertisement that highlights features of the product that statistics or experience indicate typically interests adults. In this manner, the ad management system can generate an interest in a product or service in various users of a close-knit group.

In one or more embodiments, customizing the advertisement can include modifying the advertisement and/or selecting an advertisement pre-configured or modified to target a particular user characteristic. For example, the ad management system can select or modify advertisment overlays or other graphical user interface elements that describe a feature likely of interest to a particular user. In such embodiments, a marketer can indicate which features are likely of interest to users having particular characteristics. In additional or alternative embodiments, the ad management system can select pre-configured advertisements from an ad campaign that target users with particular characteristics. Thus, the ad management system can present unique information for the advertisement to each user based on the identified characteristics.

In addition to the foregoing, the ad management system can determine which features of a product or service a particular user is interested in and then highlight the identified feature in advertisements to other users in the group. In particular, the ad management system can determine which features of a product or service a user is interested in based on the timing or location of an engagement with the advertisement. For example, the ad management system can identify specific portions of the advertisement (e.g., a specific frame or time in a video) when a user engages an advertisement. The ad management system can identify which feature(s) of an advertised product or service corresponded to the portion of the advertisement that the user engaged. In particular, the ad management system can map the identified portion of the advertisement to a feature of the product using a table or other index provided by a marketer that indicates which portions of an advertisement correspond to particular features of a product. The ad management system can then customize the advertisement to send to one or more other users in the group by highlighting the feature that interested the user. As such, the ad management system can provide a tailored advertisement experience that stimulates interest in various features of a product or service that interests users in a group to increase the odds of conversion.

Furthermore, the ad management system can provide a customized advertisement experience to one or more client devices in a timely manner after a user engagement with the advertisement at a first client device. Specifically, the ad management system can determine an appropriate time for showing a customized advertisement to one or more client devices after receiving an indication of a user engagement with the advertisement associated with the first client device. For example, the ad management system can detect that other users in the group are concurrently streaming content. By determining that multiple users are concurrently using client devices, the ad management system can simultaneously target the users in the group with an advertisement.

As used herein, the term "concurrent streaming account" refers to an account or subscription to one or more content providers that allow for multiple devices or users to simultaneously or concurrently stream or otherwise access content. As used herein, the term "content" refers to digital media. For example, content can comprise videos, live television, live sports, music, photos, news, movies, etc. A concurrently streaming account can comprise a subscription to a movie/TV/sports/video streaming service that allows two or more devices/users to simultaneously stream content. A single concurrent streaming account can have a single login or credential that multiple users/devices can use to authenticate to the service and stream content. The concurrent streaming account can allow users (up to a predetermined number) stream the same or different content simultaneously.

The users who share a concurrent streaming account can comprise a family or another close-knit group (friends, room-mates, colleagues, etc.). The group of users who share a concurrent streaming account by the nature of their close-knit relationship can influence each other in relation to purchasing decisions. For example, a family can jointly decide what type of car, furniture, vacation package, etc. to purchase. Similarly, roommates can discuss or jointly decide what type of gaming system, TV, furniture, or other products to purchase. As discussed herein, the ad management system can leverage the ability to detect or identify users in a close-knit group based on the use of a concurrent streaming account to target advertisements to the users.

As used herein, the term "user engagement" refers to detectable user actions associated with an advertisement. Specifically, a user engagement can include user actions that may indicate to the ad management system that a user may be interested in one or more features of the advertisement (i.e., a feature of a product or service associated with the advertisement). For example, a user engagement can include playback of an advertisement, selection of a portion of an advertisement, selection of user interface elements associated with the advertisement, or other user actions related to the advertisement or the client device. To illustrate user engagements can include, but are not limited to, replaying an advertisement, rewinding an advertisement, pausing an advertisement at a specific location, zooming in on a specific feature of an advertisement, selecting a call to action element in the advertisement, selecting an interactive feature of an advertisement, watching an extended version of an advertisement, not skipping or fast-forwarding an advertisement, or selecting an element in an ad control bar associated with the advertisement.

As used herein, the term "ad campaign" refers to a set of one or more advertisements sharing one or more common characteristics. Specifically, such common characteristics can include similar content (e.g., directed toward the same product, line of products, or brand), a similar theme (e.g., a particular sale, products for a particular season), or features directed toward a particular audience. For example, an advertiser can include related advertisements in an ad campaign that are each directed towards a single brand, product, or service. Alternatively, an advertiser can include advertisements in an ad campaign that are each directed toward different products or features of a line of products or services. For example, an advertiser can configure an ad campaign of a plurality of advertisements for a single product or service. The advertiser can customize each advertisement in the ad campaign differently. Specifically, the advertiser can customize the different advertisements to different age groups or to highlight or focus on different features of a product or service.

As used herein, the term "age profile" refers to an age or age range attributable to a user/client device. An age profile can be based on content or content type viewed by the user/client device. As used herein, the term "content type" refers to an identifying characteristic of content from a content provider. Specifically, a content type allows an ad management system to distinguish a particular piece of content from another piece of content. For example, a content type can include, but is not limited to, a medium for delivering content (e.g., audio, still-frame image, text or video), content categories (e.g., a TV, movie or music genre), and/or a content length (e.g., feature length movie or short film). To illustrate, example content types include police dramas, cartoons, and music videos. The ad management system, based on statistics, analytics, studies, or logic/rules built into the system based on common sense can identify that on average police dramas are most commonly watched by adults, cartoons are most commonly watched by children, and music videos are most commonly watched by teenagers. Based on this information, when a client device frequently (greater than a predefined number of times) views cartoons, the ad management system can associate a child age profile with the client device. Similarly, when a client device frequently views police dramas, the ad management system can associate an adult age profile with the client device. Still further, when a client device frequently views music videos, the ad management system can associate a teenage age profile with the client device.

FIG. 1 illustrates a schematic diagram of a system 100 in which an ad management system 102 in accordance with one or more embodiments can operate. In one or more embodiments, the system 100 includes the ad management system 102 connected to a content provider 104 and a plurality of client devices 106a-106d via a network 108. Although the system 100 of FIG. 1 is depicted as having various components, the system 100 may have any number of additional or alternative components (e.g., any number of client devices 106a-106d and/or more than one content provider 104). For example, more than one component or entity in the system 100 can implement the ad management system 102.

In one or more embodiments, the content provider 104 can store, manage, and provide various types of content. Specifically, the content provider 104 can manage and provide video, audio, and/or other types of content to one or more of the client devices 106a-106d. For example, the content provider 104 can stream one or more types of content to the client devices 106a-106d. To illustrate, example content providers 104 include cable television providers, television networks, streaming movie and television providers, streaming music providers, etc.

Additionally, the client devices 106a-106d can include any computing devices that allow users to access content from the content provider 104. For example, the client devices 106a-106d can include smartphones, tablets, desktops, smart TVs, set-top boxes, or other devices that are able to stream content. The client devices 106a-106d may include a client application (e.g., content player 107) that enables the playing of streaming content at the client devices 106a-106d. Furthermore, the client devices 106a-106d can comprise any of the devices or features discussed below in reference to FIG. 7.

According to one or more embodiments, the content provider 104 can provide content to a client device 106a based on a concurrent streaming account. For example, in order to access content from the content provider 104, each of the client devices 106a-106d may authenticate with the content provider 104 or the ad management system 102 using credentials associated with a concurrent streaming account. To illustrate, a client device 106a may allow a user to input the credentials into the client application to login to the concurrent streaming account and access the content from the content provider 104.

In one or more implementations, users of each of the client devices 106a-106d can authenticate the corresponding client devices 106a-106d using the same (or related) credentials. Thus, a plurality of client devices 106a-106d can stream content from the content provider 104 in association with a single concurrent streaming account. For example, each of the client devices 106a-106d may authenticate with the content provider 104 using a single concurrent streaming account and stream content concurrently or non-simultaneously.

In one or more embodiments, the content provider 104 can also limit the number of users that can view streaming content at the same time using a single concurrent streaming account. Frequently, users will share their credentials with others, such that several users may stream content concurrently using a single account. For example, family members often share a single account for use on multiple client devices 106a-106d. By limiting the number of concurrent streams available for a single concurrent streaming account, the content provider 104 can reduce fraud and encourage the purchase of additional licenses or concurrent streaming accounts.

The ad management system 102 can work in conjunction with the content provider 104 to provide advertisements with the streaming content from the content provider 104. Specifically, the ad management system 102 can provide targeted advertising to the client devices 106a-106d in conjunction with content associated with the content provider 104. For example, while the content provider 104 provides streaming content to one or more of the client devices 106a-106d, the ad management system 102 can provide targeted advertisements to the client devices 106a-106d based on, and in association with, the streaming content. In additional or alternative embodiments, the ad management system 102 can use information about the users, the concurrent streaming account, and/or the client devices 106a-106d to provide the targeted advertising.

In one or more embodiments, the ad management system 102 seamlessly inserts advertisements into live, linear or video-on-demand (VOD) content. In particular, the ad management system 102 can create engaging, buffer-free ads and content experience for viewers. The ad management system 102 can provide the ads to the content provider 104, which can provide the ads together with the streaming content to the client devices 106a-106d in a single data stream. Alternatively, the ad management system 102 can provide the advertisements directly to a player 107 on the client devices 106a-106d. The player 107 can integrate the advertisements with the streaming content received from the content provider 104.

The ad management system 102 can provide buffer-free ads by avoiding a dual-player situation in which one player provides the streaming content and another player provides the advertisement. In particular, a single player 107 on a client device 106a-106d can play a stream of content from the content provider 104 that includes advertisements stitched into the stream at appropriate places. Alternatively, the ad management system 102 can provide the advertisements directly to a player 107 at the client devices 106a-106d, the player 107 can then leverage broadcast ad break cues (e.g., SCTE 35), markers injected in real-time via a "big red button" interface, or ad timelines stored in the content provider's 104 content management system. In any event, upon detecting the need for an advertisement, the player 107 can seamlessly insert an advertisement provided by the ad management system 102 into the streaming content from the content provider 104.

Figure 2:
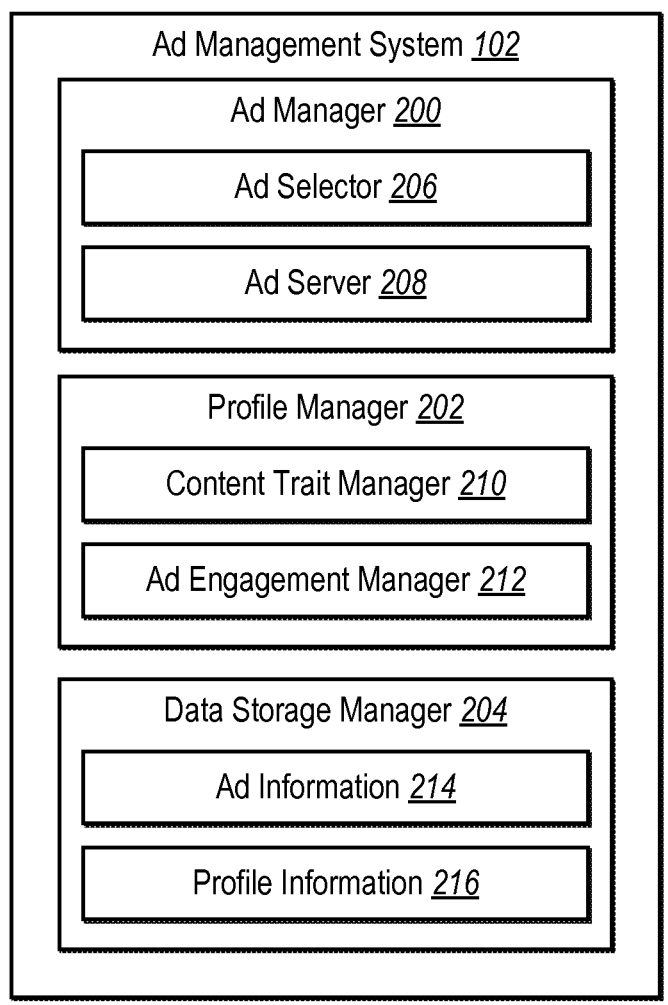
FIG. 2 illustrates a schematic diagram of the ad management system of FIG. 1 in accordance with one or more embodiments.

FIG. 2 illustrates a schematic diagram of one or more embodiments of the ad management system 102 of FIG. 1. The ad management system 102 may include, but is not limited to, an ad manager 200, a profile manager 202, and a data storage manager 204. Each of the components of the ad management system 102 can be in communication with one another using any suitable communication technologies. It will be recognized that although the components of the ad management system 102 are shown to be separate in FIG. 2, any of the components may be combined into fewer components, such as into a single component, or divided into more components as may serve a particular implementation.

The components can comprise software, hardware, or both. For example, the components can comprise one or more instructions stored on a computer-readable storage medium and executable by processors of one or more computing devices (e.g., client devices 106a-106d and/or server devices). When executed by the one or more processors, the computer-executable instructions of the ad management system 102 can cause the computing device(s) to perform the automation methods described herein. Alternatively, the components can comprise hardware, such as a special purpose processing device to perform a certain function or group of functions. Additionally or alternatively, the components can comprise a combination of computer-executable instructions and hardware.

Furthermore, the components of the ad management system 102 may, for example, be implemented as a stand-alone application, as a module of an application, as a plug-in for applications including image processing applications, as a library function or functions that may be called by other applications such as image processing applications, and/or as a cloud-computing model. Thus, the components of the ad management system 102 may be implemented as a stand-alone application, such as a desktop or mobile application (e.g., an application running on a personal computing device). Alternatively or additionally, the components of the ad management system 102 may be implemented in any application that allows users to modify documents, including but not limited to ADOBE PRIMETIME, ADOBE AUDIENCEMANAGER and AUDITUDE. "ADOBE", "ADOBE PRIMETIME," "ADOBE AUDIENCEMANAGER", and "AUDITUDE" are registered trademarks of Adobe Systems Incorporated in the United States and/or other countries.

As mentioned above, the ad management system 102 can include an ad manager 200. In one or more embodiments, the ad manager 200 provides advertisements. Specifically, the ad manager 200 can include components for providing advertisements to the client devices 106a-106d over the network 108 in association with content from the content provider 104. For example, the ad manager 200 can communicate with the content provider 104 to determine when to provide an advertisement to one or more of the client devices 106a-106d. The ad manager 200 can also communicate with the client devices 106a-106d when providing the advertisements in association with the content. Alternatively, the ad manager 200 can provide advertisements to the content provider 104 for delivering advertisements to the client devices 106a-106d seamlessly with the content.

In one or more embodiments, the ad manager 200 can include an ad selector 206. In particular, the ad selector 206 can select advertisements for providing to one or more of the client devices 106a-106d. For example, the ad selector 206 can select advertisements based on information associated with the client devices 106a-106d and/or the streaming content from the content provider 104. To illustrate, the ad selector 206 can identify an age profile applicable to a client device 106a based on one or more content types streamed to the client device 106a as alluded to above and as described in more detail below. The ad selector 206 can then select an advertisement that is tailored to the identified age profile associated with the client device 106a.

Additionally or alternatively, the ad selector 206 can select the advertisement from a set of pre-configured advertisements. For example, an advertiser can provide several advertisements for a single product in a set of advertisements (e.g., for an ad campaign). Each of the advertisements can include content tailored to a particular age group or demographic. To illustrate, a first advertisement can highlight or focus on features of a product that would appeal to a teenager. A second advertisement can highlight or focus on features of the product that would appeal to a mom or dad. The ad selector 206 can select the first advertisement to serve to a client device 106a with an age profile of 13-16. Along related lines, the ad selector 106 can select the second advertisement to serve to a client device 106b with an age profile of 35-45.

In additional or alternative embodiments, the ad selector 206 can customize advertisements for providing to the client devices 106a-106d. For example, the ad selector 206 can modify an advertisement by adding or deleting features or content that would appeal to a particular age demographic or gender. In particular, each advertisement can include features identified as appealing to particular age demographic, gender, or other user characteristic. The ad selector 206 can customize an advertisement for a particular user characteristic by inserting a link or banner in an overlay dedicated to a particular feature of the product associated with the advertisement, as described below, for example, in conjunction with FIG. 4A.

Additionally, the ad manager 200 can include an ad server 208. Specifically, the ad server 208 can provide the selected advertisements to the client devices 106a-106d or the content provider 104. For example, the ad server 208 can communicate with the content provider 104 to determine when and how to provide the advertisements to the client devices 106a-106d. To illustrate, the content provider 104 can send a request for an ad from the ad management system 102 to present in association with content streaming at a client device 106a, and the ad server 208 can serve up the advertisement for delivering to the client device 106a.

The ad manager 200 can allow an advertiser to configure an ad campaign. For example, the ad manager 200 can provide a user interface or other input mechanism that allows an advertiser to specify different ads for different user characteristics (age, gender, location, etc.). As described below, the ad server 208 can serve an ad marked for users of a particular age profile (as indicated by the advertiser) to a device deemed to be used by a user of the particular age profile.

Additionally, the ad manager 200 can allow the advertiser to specify different ads for different engagement types. For example, the advertiser can specify that if a first type of user engagement is detected on a first advertisement at a first client device of a close-knit group, the ad server 208 is to provide a second advertisement to the first client device or another client device in the close-knit group.

Thus, the ad manager 200 can allow the advertiser to select a targeting algorithm. In particular, the advertiser can select to target around common features, to target features per user characteristics, or both. A common-feature targeting algorithm can cause the ad management system 102 to serve advertisements to client devices in a close-knit group about the same features. For example, the ad management system 102 can identify that a first user is interested in a first feature of a product based on a user engagement with an advertisement. In response, the ad management system 102 can send the other client devices in the close-knit group advertisements that focus on the feature of interest to the first user.

A features-per-user-characteristic based targeting algorithm can cause the ad management system 102 to identify and associate characteristics with client devices in a close-knit group. Specifically, the ad management system 102 can determine characteristics for a close-knit group of client devices by identifying content and content types streaming to the client devices. For example, the ad management system 102 can associate a characteristic (e.g., an estimated user age group) with each of the client devices based on the content types streamed to each client device and content types commonly associated with each characteristic (e.g., as determined by data collected for a plurality of users with each characteristic).

Then the ad management system 102 can customize or select customized advertisements to serve to the client devices in the close-knit group based on the identified user characteristics of each client device. For example, if a first client device with an associated child age profile views an advertisement about a TV and engages with a portion of the advertisement that relates to video game streaming features of the TV, the ad management system 102 can know that the user of the first client device is interested in the TV. In order to help the other users in the close-knit group to develop interest in the TV, the ad management system 102 can serve, to other client devices in the close-knit group of users, advertisements about the TV that focus on features deemed likely to be of interest to the other users. To illustrate, the ad management system 102 can serve, to the other client devices in the close-knit group, advertisements about the TV that focus on features that correspond to identified characteristics associated with the client devices. For example, the ad management system 102 can serve a client device deemed to be associated with a mother or father an advertisement about the TV that highlights the parental control features of the TV.

The ad manager 200 can also allow an advertiser to tag different portions, time periods, or potential user engagements with one or more different features of a product or service being advertised. For example, an advertiser can configure or identify that the first 12 seconds of an advertisement discuss a first feature of a product. Thus, the ad manager 200 can allow/prompt the advertiser to tag the first 12 seconds of the advertisement with the first feature. The tagging done by the advertiser can allow the ad management system 102 to map user engagements to different features of an advertised product or service.

The ad management system 102 can also include a profile manager 202 to manage profiles for targeting advertisements to the client devices 106a-106d. Specifically, the profile manager 202 can provide information to the ad manager 200 that allows the ad manager 200 to select the appropriate advertisements for providing to the client devices 106a-106d. For example, the profile manager 202 can provide information about the content, a corresponding client device 106a, a user of the client device 106a, and/or user engagements with advertisements at other client devices 106b, 106c, 106d to the ad manager 200.

In one or more embodiments, the profile manager 202 can include a content trait manager 210. The content trait manager 210 can determine traits associated with content that is streaming or has streamed to the client devices 106a-106d. To illustrate, the content trait manager 210 can obtain information describing one or more traits for the content from the content provider 104. For example, a content provider 104 can indicate that a certain video comprises a certain genre of content (e.g., sports, cartoons). Thus, when a client device streams this content, the content trait manager 210 can identify that the user of the client device has accessed a certain genre of content. Additionally or alternatively, the content trait manager 210 can obtain traits about the content from a client device 106a receiving the content or from another component in the system 100. For example, the client device 106a can send a cookie to the profile manager 202 that indicates the content that the client device 106a is streaming. Determining traits associated with the content can allow the ad management system 102 to identify or estimate certain characteristics of users of client devices that access the content, which can be useful in providing targeted advertisements to the client devices.

Additionally, the content trait manager 210 can monitor or detect when a client device 106a-106d is streaming or otherwise accessing content in association with a concurrent streaming account. For example, while streaming content, the player 107 sends a ping or status indicator to the content trait manager 210 in accordance with a predetermined timing scheme (e.g., every 10 seconds). The content trait manager 210 can determine whether a particular client device 106a-106d is currently streaming content in association with a concurrent streaming account based on the receipt or lack of receipt of the pings. To illustrate, if the content trait manager 210 does not receive a ping from the player 107 within a predetermined time window, the content trait manager 210 can determine that the particular client device 106a-106d is not currently streaming content. Alternatively, a steady streams of pings from a client device can inform the content trait manager 210 that the client device is currently streaming content. The pings or status indicators can comprise a data packet that includes a video/ad name, player name, channel, and any additional custom variables that a marketer wants to track for that video/ad.

The profile manager 202 can also include an ad engagement manager 212 to identify interactions with the advertisements. Specifically, the ad engagement manager 212 can determine that a user engages with an advertisement based on an indication of the user engagement from the client device 106a or the content provider 104. For example, when a user engages with an advertisement at a client device 106a, the client device 106a can send an indication of the user engagement to the ad management system 102. In particular, the player 107 can send an API call when events happen inside the player 107. For example, the player 107 can send an API call when the player 107 loads a video asset, unloads a video asset, starts playing a video, pauses a video, completes a video, starts an advertisement, when an advertisement completes, when a user selects a link in an advertisement, etc. For example, when a user selects a link for more information, the player 107 can send an API call that includes an advertisement ID, an advertisement length, a position (i.e., time) within the advertisement in which the link was selected, and a link ID. Similarly, if a user rewinds an advertisement, the player 107 can send an API call that includes the advertisement ID, the advertisement length, a position (i.e., time) within the advertisement at which the advertisement was rewound, and a position (i.e., time) to which the advertisement was rewound.

As described above, the ad management system 102 can include a data storage manager 204 to facilitate storage of information for the ad management system 102. In particular data storage manager 204 can store information used by one or more of the components in the ad management system 102 to facilitate the performance of various operations associated with targeted advertising. In one or more embodiments as shown in FIG. 2, the data storage manager 204 maintains ad information 214 and profile information 216. The data storage manager 204 may also store any additional or alternative information corresponding to the operation of the ad management system 102. The data storage manager 204 can maintain additional or alternative data as may serve a particular implementation. The data storage manager 204 may communicate with any component within the ad management system 102 to obtain or share information for customizing advertisements associated with the ad management system 102. In one or more embodiments, the data storage manager 204 includes one or more servers on which various types of data are stored. For example, the data storage manager 204 may include or may be implemented in a data storage environment.

In one or more embodiments, the ad information 214 can include data representing information about advertisements available to the ad management system 102. More specifically, the ad information 214 can include information for mapping the advertisements to specific content and/or client devices 106a-106d. For example, the ad information 214 can include ad traits that indicate a type of advertisement, an intended audience for the advertisement, a length of the advertisement, a provider of the advertisement, or other information that may allow the ad management system 102 to determine which advertisements to provide to a particular client device 106a.

According to one or more embodiments, the profile information 216 can include data representing information about client devices 106a-106d and/or users within the system 100. In particular, the profile information 216 can include information that describes traits or characteristics of each client device 106a-106d to allow the ad management system 102 to provide appropriate advertisements to the client devices 106a-106d. For example, the profile information 216 can include information that indicates which advertisements/information is most likely to result in converting a user of the client device 106a into a customer.

Although the data storage manager 204 in FIG. 2 is described to include the ad information 214 and the profile information 216, the data storage manager 204 can include additional or alternative information related to the ad management system 102, as previously mentioned. Additionally, the data storage manager 204 can include information for other types of systems and processes. For example, the data storage manager 204 can manage a distributed storage space configured to interface with one or more systems in addition to the ad management system 102, allowing the different systems to interact with one another.

As an overview, when any client device of a close-knit group watches video content using a concurrent streaming account, the client device can pass one or more pieces of information to the profile manager 202. For example, the client device can pass a device ID, a common concurrent ID, a video type, any engagements detected (R for replay, RW for rewind, etc.), and an advertisement ID (for a specific advertisement). The profile manager 202 can use this information associated with each client device to assign age profiles to the corresponding client devices within the close-knit group. Thus, as described below, the profile manager 202 can have a table that maps common concurrent IDs, device IDs, and age profile IDs so that the ad management system 102 can quickly identify client devices with their corresponding age profiles and concurrent streaming accounts.

In one or more embodiments, when client device is streaming content using a particular common concurrent ID and needs an advertisement, a plug-in on the player 107 of the client device can request, receive, or access a cookie form the profile manager 202. The cookie can include the common concurrent ID and the device ID, as described in more detail with respect to FIG. 3. The client device can pass the cookie to the ad server 208 along with an ad call. The ad server 208 can then use the cookie to select and serve an advertisement in accordance with a predetermined or default targeting algorithm (e.g., common feature targeting or characteristic-based feature targeting). Alternatively, the profile manager 202 can pass the cookie directly to the ad server 208 in a server-to-server call or via an API.

The ad server 208 can retrieve information from the cookie. Based on the retrieved information and the advertisement IDs from each of the client devices, the ad server 208 can find a set of advertisements that have been engaged by other client devices in the close-knit group. Specifically, the ad server 208 can select any advertisement from the set using the advertisement ID, find the selected advertisement's campaign ID for the corresponding ad campaign, and identify any engagements for the selected advertisement performed on other devices in the close-knit group based on the collected engagement information associated with the corresponding advertisement ID.

The ad server 208 can then retrieve the age profile ID for the current device ID. For the current device making the ad call, the ad server 208 can select an advertisement from the identified campaign ID corresponding to the retrieved age profile ID (in the case of characteristic-based feature targeting) or the identified engagement (in the case of common feature targeting).

Figure 3:
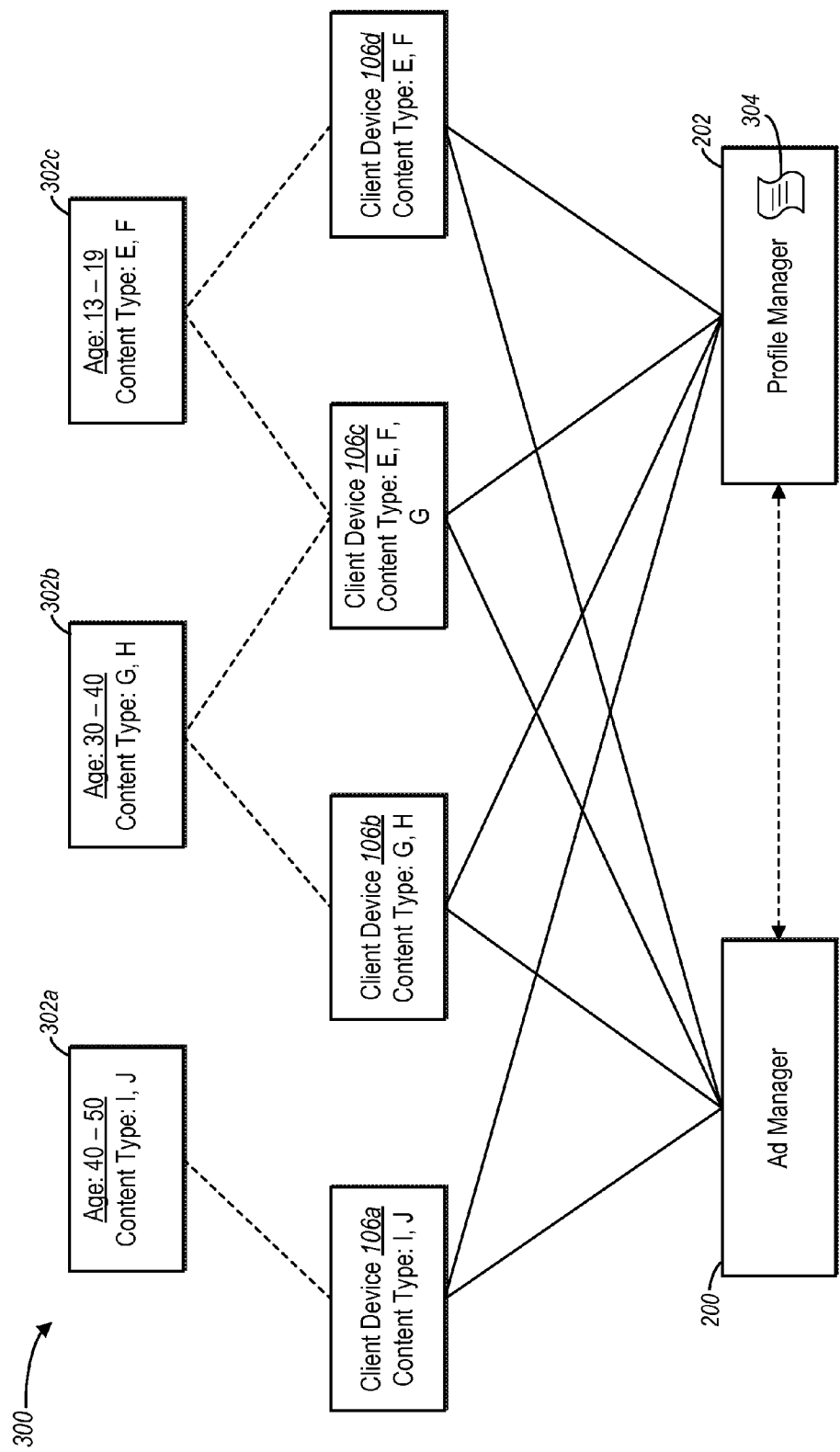
FIG. 3 illustrates a schematic diagram of a profile management architecture in accordance with one or more embodiments.

As mentioned above, the ad management system 102 can provide targeted advertisements to users of a close-knit group to increase ad conversion. To allow for the targeting of advertisements to the users of a close-knit group, the ad management system 102 can track or compile information about the users and/or devices in the close-knit group. As described above, a close-knit group of users, in one or more embodiments, can comprise a group of users who share a concurrent streaming account. The ad management system 102 can identify users who share a concurrent streaming account and can profile the users to aid in serving ads to the users. FIG. 3 illustrates a schematic diagram of one or more embodiments of a profile management architecture 300 that creates and manages profiles for users/devices in a close-knit group. The profile management architecture 300 allows the ad management system 102 to match specific profiles to specific devices, and target advertisements to the client devices 106a-106d based on the corresponding profiles.

As described in FIG. 2, the ad management system 102 includes an ad manager 200 and a profile manager 202. The ad manager 200 and the profile manager 202 can communicate with one or more of the client devices to identify client devices, characteristics or traits of the client devices, and information about concurrent streaming accounts for identifying groups of related client devices for determining which advertisements and/or information associated with the advertisements to provide to each of the client devices. For example, the profile manager 202 can communicate with the client devices to identify profile information 216 associated with the client devices. Additionally, the ad manager 200 can communicate with the client devices to determine which advertisements to provide to the client devices based on corresponding age profiles or age segments (e.g., age groups), described in more detail below.

The ad management system 102 can identify a group of client devices 106a-106d that are part of a close-knit group based on the client devices 106a-106d each using a common concurrent streaming account to access content from one or more content providers. As briefly described previously and in more detail below in paragraphs, the ad management system 102 can then assign one or more age profiles 302a-302c to each of the client devices 106a-106d based on whether content accessed by the client devices 106a-106d corresponds to content types associated with age groups in the age profiles 302a-302c. The ad management system 102 then optionally uses the age profiles 302a-302c when selecting advertisements to serve to the client devices 106a-106d.

More specifically, each client device 106a-106d can include a client application (e.g., player 107) that includes a plug-in. The plug-in can obtain information about the client device and the users and send this information to the profile manager 202. To illustrate, a video player playing content at a client device 106a-106d can include a plug-in (e.g., ADOBE AUDITUDE) that obtains the information about the client device 106a-106d, the user, and/or the content and sends the information to the profile manager 202. In particular, the plug-in or another component of the client device 106a-106d can pass a device/unique identifier and a common concurrent streaming account user identifier used to access content from one or more content providers to the profile manager 202.

The common concurrent streaming account user identifier (also called concurrent user ID herein) can comprise an ID that maps to a user account that allows a user to obtain/access content from a content provider 104. The concurrent user ID can comprise a hash of an account number or another identifier that is passed to the profile manager 202 by the client device (via the player 107 or plug-in). For example, a user can provide a username and password to login into/authenticate with the content provider 104. In response, the content provider 104 can pass a cookie to the client device. The cookie can include or reference the concurrent user ID. The client device can then pass the cookie to the profile manager 202. Similarly, the ad management system 102 can identify unique identifiers for the devices in HTTP "subscriber ID headers" (e.g., "deviceID," "clientID," "callinglineID") in communications between the client device and the content provider or other component of the system 100.

In one or more embodiments, the ad management system 102 can associate the client device with the concurrent streaming account based on the identifiers. Specifically, the ad management system 102 can associate a client device with a concurrent streaming account by storing the unique device ID with the concurrent user ID in a database (e.g., the data storage manager 204) mapping client devices to corresponding concurrent streaming accounts. In one or more embodiments, the profile manager 202 can map a client device to more than one concurrent streaming account and/or a concurrent streaming account to more than one client device.

Additionally, the profile manager 202 can communicate with the client devices to identify additional profile information 216 associated with the client devices and/or the content accessed by the client devices. For example, the profile manager 202 can identify content types, characteristics of users associated with the client devices, user engagements with advertisements, characteristics of the user engagements, and/or other profile information 216 associated with the client devices, users, and/or content. The ad management system 102 can store the identified profile information 216 (in addition to the unique device ID and concurrent user ID) in data files 304 for each of the client devices. The data files 304 can allow the ad management system 102 to use the identified information when selecting advertisements for the client devices.

Additionally, after associating a client device with a concurrent streaming account, the ad management system 102 can determine related client devices. Specifically, the ad management system 102 can identify one or more other client devices that correspond to the same concurrent streaming account. For example, the ad management system 102 can compare the concurrent user IDs for each of the client devices in the database to find client devices that use the same concurrent user IDs. By identifying client devices associated with the same concurrent streaming account, the ad management system 102 can target advertisements to the client devices to generate interest among the users of the related client devices, as described with reference to FIGS. 4A-4C.

As described above, the ad management system 102 can store profile information 216 for the client devices. Specifically, the ad management system 102 can store the content types, age information, and/or other information that identifies client devices or characteristics about the client devices in data files 304. The ad management system 102 can then associate the information with the client devices based on the content of the data files 304. In additional or alternative embodiments, the ad management system 102 can store the profile information 216 or additional information about the client devices in another location.

In one or more embodiments, the profile management architecture 300 also includes or maintains profiles that describe types of content associated with specific characteristics. In particular, FIG. 3 illustrates age profiles 302a, 302b, 302c associated with specific content types. For example, the age profiles 302a-302c can be associated with ages or age groups assigned to the client devices (or to users of the client devices) based on the type of content streamed to or detected at the client devices. To illustrate, the ad management system 102 can determine the age ranges of the age profiles 302a-302c by estimating the age of users commonly associated with specific types of content. Although the profile management architecture 300 describes age profiles, the profile management architecture 300 may include one or more profiles associated with additional or alternative types of characteristics that allow the ad management system 102 to provide better targeted advertisements, such as gender, roles in a group, relationships between users, user location, and/or types of client devices.

In one or more embodiments, the age ranges associated with each age profile allow the profile manager 202 to associate users with age groups that tend to have similar interests or tastes, as mentioned previously. To illustrate, as shown in the profile management architecture 300 of FIG. 3, a first age profile 302a is associated with a first age range (e.g., 40-50), a second age profile 302b is associated with a second age range (e.g., 30-40), and a third age profile 302c is associated with a third age range (e.g., 13-19). In alternative examples, the profile management architecture 300 can include more or fewer age profiles that are associated with larger or smaller age ranges than shown in FIG. 3. Including more age profiles, may allow the ad management system 102 to target additional groups of users.

According to one or more embodiments, the profile management architecture 300 can include additional or alternative characteristics in the profiles. For example, the profile management architecture 300 may include more than one age profile for the same age range with additional distinguishing characteristics. To illustrate, two age profiles for the same age ranges may be associated with content typically associated with opposite genders. Maintaining separate age profiles for males and females of the same age range may allow the ad management system 102 to target users associated with the separate age profiles with different advertisements.

According to one or more embodiments, the profile manager 202 can associate the age profiles 302a-c with specific types of content. Specifically, the profile manager 202 assigns content types to the age profiles 302a-302c based on interests commonly associated with the corresponding age ranges. For example, the profile manager 202 can associated each age profile with one or more content types expected to be seen/heard by the corresponding age range. To illustrate, in FIG. 3, the profile manager 202 associates the first age profile 302a with a first set of content types (e.g., "drama" represented as "I", "sports" represented as "J"), the second age profile 302b with a second set of content types (e.g., "romance" represented as "G", "action" represented as "H"), and the third age profile 302c with a third set of content types (e.g., "animated" represented as "E", "comedy" represented as "F"). Although FIG. 3 illustrates sets of two types of content for each age profile, profile manager 202 can associate the age profiles 302a-302c with a number of content types depending on the content typically accessed by each corresponding age group, and may include overlapping content types across multiple age profiles 302a-302c.

In one or more embodiments, the ad management system 102 can use statistical data from surveys or other sources to determine which content types to associate with each age profile. For example, the ad management system 102 can gather statistical data from the content provider or from a source external to the system 100 to determine the content types associated with the age profiles. In one example, the table below illustrates sample percentages of users that watch specific video content types:

| All | Type of Video | 18-29 | 30-49 | 50+ |
|---|---|---|---|---|
| 74% | Comedy/Humor | 82% | 75% | 61% |
| 72% | How-to | 78% | 72% | 67% |
| 64% | Music | 81% | 67% | 39% |
| 36% | Animation | 47% | 38% | 20% |
| 35% | Sports | 42% | 37% | 25% |
| 16% | Adult | 25% | 17% | 4% |

As shown in FIG. 3, the profile management architecture 300 illustrates assignments of age profiles to client devices in the system 100. In one or more embodiments, the ad management system 102 assigns an age profile to a client device by storing profile information 216 in the data file 304 (e.g., a cookie) accessible to the ad server 208, the profile manager 202, and the client device. Additionally, the ad management system 102 can allow the client device to store information about content, advertisement, or user engagement activity at the corresponding client device in the cookie for use by the profile manager 202 and/or the ad server 208. For example, when the client device receives streaming content, the client device can store information about the streaming content in the cookie, and the profile manager 202 can obtain the cookie from the client device to identify a previously stored profile for the client device. Alternatively, the client device can send update information to the profile manager 202 about the streaming content, and the profile manager 202 can then update the cookie with the new information.

More specifically, each client device can include a client application or a plug-in for a client application that obtains the information for sending to the profile manager 202. To illustrate, a video player playing content at a client device can include a plug-in (e.g., AUDITUDE) that obtains the information about the client device, the user, and/or the content and sends the information to the profile manager 202. The profile manager 202 can then generate a profile for the client device and store at least some of the information in a cookie assigned to the concurrent user ID and the unique device ID, as previously mentioned. Thus, the profile manager 202 can tie the profile information 216 to the client device and/or to the concurrent streaming account based on information received from the client device.

When assigning an age profile to a client device, the profile manager can access the data file 304 for the corresponding client device to obtain the profile information 216 associated with the client device. Specifically, the profile manager can access content types associated with the client devices to determine age profiles for the client devices. For example, the profile management architecture 300 shows content types associated with the client devices in the system 100. To illustrate, a first client device 106a in FIG. 3 is associated with a first set of content types (e.g., I, J), a second client device 106b is associated with a second set of content types (e.g., G, H), a third client device 106c is associated with a third set of content types (e.g., E, F, G), and a fourth client device 106d is associated with a fourth set of content types (e.g., E, F).

In one or more embodiments, the profile manager 202 can assign the age profiles to the client devices based on the content types associated with the age profiles and the content types associated with the client devices. In particular, the profile manager 202 can determine whether content types associated with the client devices correspond to the content types associated with one or more of the age profiles. For example, if the content types associated with a client device correspond to the content types associated with an age profile, the profile manager 202 can assign the corresponding age profile to the client device. To illustrate, the content types associated with the first client device 106a match the content types associated with the first age profile 302a, the content types associated with the second client device 106b match the content types associated with the second age profile 302b, and the content types associated with the fourth client device 106d match the content types associated with the third age profile 302c. Thus, the profile manager 202 can assign the first age profile 302a to the first client device 106a, the second age profile 302b to the second client device 106b, and the third age profile 302c to the fourth client device 106d.

As shown in FIG. 3, one or more client devices may be associated with content types that overlap with more than one age profile. For example, a client device may access or stream content that corresponds to a plurality of age groups. For instance, if more than one user in different age ranges and with different interests accesses content from the same device the profile manager 202 can determine that the client device is associated with content types corresponding to two different age profiles. To illustrate, the profile manager 202 can detect that the third client device 106c accesses content of a type associated with the second age profile 302b and content of a type associated with the third age profile 302c.

If the profile manager 202 determines that a client device 106c accesses content types corresponding to more than one age profile 302, the profile manager 202 can assign more than one age profile 302b, 302c to the client device 106c. For example, the profile manager 202 can assign the second age profile 302b and the third age profile 302c to the third client device 106c. Thus, the ad manager 200 can identify advertisements for providing to the third client device 106c based on the second age profile 302b and/or the third age profile 302c. In one example, the ad manager 200 can identify advertisements for providing to the third client device 106c in association with the second age profile 302b or the third age profile 302c based on content that is currently streaming to the third client device 106c.

In alternative embodiments, the profile manager 202 can assign only one age profile 302 to each of the client devices. In particular, if a client device accesses content types corresponding to more than one age profile, the profile manager 202 can select one age profile to assign to the client device. For example, the profile manager 202 can select the age profile 302 based on the type of content most frequently accessed by the client device. To illustrate, if the third client device 106c accesses content types corresponding to the third age profile 302c more frequently than content types corresponding to the second age profile 302b, the profile manager 202 can assign the third age profile 302c to the third client device 106c.

According to one or more embodiments, the profile manager 202 can assign age profiles to client devices by weighting the content types. For example, some content types may more uniquely identify an age profile 302 than others, and may thus have a greater weight when assigning the age profiles to the client devices. To illustrate, users in a first age profile 302a may access a first content type twice as much as users in a second age profile 302b, while the users in the first age profile 302a may access a second content type only slightly less than the users in the second age profile 302b. Thus, while the first content type and the second content type may indicate a likelihood of a particular client device corresponding to the first age profile 302a or the second age profile 302b, respectively, the profile manager 202 may give greater weight to the first content type, due to the greater disparity, if a client device is associated with both content types.

In one or more additional embodiments, the profile manager 202 can adjust age profiles 302 for the client devices. Specifically, if the content types associated with a client device change over time, the profile manager 202 can modify the age profile of the client device. For example, if a user of the client device ages (e.g., changes to a new age range) and the content accessed by the user changes, the ad management system 102 can update the age profile for the client device to reflect the change in content types. Additionally, the profile manager 202 can determine if a new user begins using the client device based on the content types and adjust the age profile accordingly.

According to one or more embodiments, the profile manager 202 can assign age profiles to the client devices based on predetermined mappings. Specifically, the profile manager 202 can assign age profiles to different combinations of concurrent user ID and unique device ID. For example, the profile manager 202 can identify every concurrent user ID and unique device ID associated with the client devices to generate as many combinations of concurrent user IDs and unique device as possible for the client devices. The profile manager 202 can then assign age profiles for each of the identified combinations.

In one or more additional or alternative embodiments, the profile manager 202 can store or maintain additional information with an age profile for a client device. Specifically, the profile manager 202 can determine a type of user engagement with an advertisement at a client device to generate additional information. To illustrate, the profile manager 202 can determine that the user is interested in one or more features of a product or service associated with the advertisement based on an indication that the user engaged the advertisement in a specific way.

In one or more embodiments, the profile manager 202 can determine information about a user of the client device based on the type of user engagement with the advertisement. For example, the profile manager 202 can determine interests associated with a user of a client device based on the user engagement and/or type of user engagement and store the determined interests in the profile corresponding to the client device for determining future advertisements. To illustrate, if the user replays an advertisement, clicks a call to action button (e.g., a link to view a corresponding product website or a link to purchase the product) or views an extended portion of an advertisement, the profile manager 202 can determine that the user is interested in the corresponding product and all of the features mentioned in the advertisement. Additionally or alternatively, if the user rewinds an advertisement, the profile manager 202 can determine that the user is interested in a product feature corresponding to the replayed portion of the advertisement. Additionally or alternatively, if the user pauses the advertisement at a specific location and/or zooms in on the location, the profile manager 202 can determine that the user is interested in the feature of the product associated with the paused/zoomed location of the advertisement. Additionally or alternatively, if the user selects an interactive portion of the advertisement (e.g., to view the product in a specific color), the profile manager 202 can determine that the user is interested in the selected feature. Additionally or alternatively, if the user selects an element in an ad control bar associated with the advertisement and views a piece of content longer than others, the profile manager 202 can determine that the user is interested in the product, and may be interested in a particular feature of the product more than other features. The profile manager 202 can determine that the user is interested in the product based on whether any user engagement occurred with the advertisement.

In one or more embodiments, the profile manager 202 can determine features associated with identified user engagements based on metadata associated with the advertisement. Specifically, the profile manager 202 can determine that an advertiser associated with the advertisement placed timeline tags or other metadata with the advertisement that allows the profile manager 202 to identify specific features associated with the metadata. For example, in response to receiving an indication of a user engagement at a particular time in an advertisement, the profile manager 202 can identify a feature associated with the particular time based on a timeline tag associated with the particular time. To illustrate, an advertiser can associate a timeline tag with a position of a time indicator at an exact time or within a time interval on a progress bar of a video player at the client device. For example, an advertiser can tag the first 30 seconds of an advertisement with one or more features. Thus, if a users rewinds and views the first 30 seconds of the advertisement, the system ad management system 102 can identify that the that the user is interested in the one or more features based on the user engagement.

As previously described, assigning age profiles to the client devices allows the ad management system 102 to customize advertising for the client devices. Specifically, the ad manager 200 can use information associated with the age profiles to determine what types of advertisements should be provided to the client devices. For example, the ad manager 200 may determine that certain types of advertisements are more effective for users in the first age profile 302a than for users in the second age profile 302b. Similarly, the ad manager 200 may determine that certain information associated with an advertisement is more relevant to users in the first age profile 302a than to users in the second age profile 302b. Thus, the ad manager 200 can provide advertisements/information to the client devices with a higher likelihood of converting the users to customers.

According to one or more embodiments, the ad manager 200 can obtain the profile information 216 and/or other information associated with the client devices from the client devices. Specifically, while the client devices are receiving streaming content from the content provider 104, the client devices can request the profile information 216 from the profile manager 202 and pass the profile information 216 to the ad server 208 as part of an ad call or ad request. To illustrate, during an ad request, the AUDITUDE plug-in for a video player at a client device can obtain the cookie from the profile manager 202 and pass the cookie, concurrent user ID, device ID, and/or an ad ID for the advertisement to the ad manager 200.

In alternative implementations, when the client device makes an ad request to the ad manager 200, the ad manager 200 can obtain the profile information 216 directly from the profile manager 202. Specifically, the ad manager 200 and the profile manager 202 can synchronize data files 304 (e.g., the cookie and identifiers) associated with the client devices. For example, the ad manager 200 and the profile manager 202 can synchronize a particular cookie based on an ad request from a specific client device. Alternatively, the ad manager 200 and the profile manager 202 can automatically synchronize the cookies for all of the client devices according to a predetermined synchronization time. Storing the profile information 216 in a cookie, and synchronizing the cookie between the ad manager 200 and the profile manager 202, can allow the ad management system 102 to provide targeted advertisements in a timely and seamless manner.

In response to receiving profile information 216 and device/user IDs in association with an ad request, the ad manager 200 can analyze the profile information 216 to determine information relevant to providing targeted advertisements to the corresponding client device. In particular, the ad manager 200 can identify characteristics about the client device and other related client devices to provide/customize advertisements to the corresponding client device. For example, the cookie can include key-value pairs for determining the age profile and ad engagement information for each client devices associated with the concurrent user ID (e.g., client devices associated with the same concurrent streaming account).

According to one or more embodiments, after identifying the age profile, engagement information, and content characteristics for a client device in association with an ad request, the ad manager 200 can identify an advertisement to provide to the client device. Specifically, the ad manager 200 can use the age profile, engagement information, and content characteristics to identify an advertisement related to at least one other advertisement provided to at least one other client device with the same concurrent user ID. For example, the ad manager 200 can select an advertisement from an ad campaign corresponding to an advertisement provided to at least one other client device with the same concurrent user ID.

To illustrate, the ad manager 200 can first find advertisements provided to other client devices with the concurrent user ID. In particular, the ad manager 200 can access information from the client devices, the profile manager 202, or a database of advertisements to determine the advertisements previously provided to the client devices. For example, the ad manager 200 can identify the advertisements using advertisement IDs associated with the corresponding advertisements previously provided to the client devices.

Additionally, the ad manager 200 can use the profile information 216 associated with the client device to determine an advertisement to provide to the client device from the identified advertisements. Specifically, the ad manager 200 can select one or more advertisements from the ad campaign based on the age profile 302, ad engagement information, and/or other characteristics associated with the client device, advertisement, or content. For example, the ad manager 200 can identify advertisements with which at least one other user has engaged on one of the other client devices. Additionally, the ad manager 200 can identify advertisements corresponding to the age profile of the client device. Thus, the ad manager 200 can select a targeted advertisement that is targeted for the estimated age of the user of the client device and based on other client devices associated with the corresponding concurrent user ID.

In one or more embodiments, the advertisement shown at a first client device 106a can be the same as a targeted advertisement shown at a second client device 106b. Specifically, the ad manager 200 can select targeted advertisements from a single ad campaign for providing to a plurality of client devices associated with a single concurrent user ID. To illustrate, if a first client device 106a has the same or similar age profiles 302 and/or other characteristics as a second client device 106b, the ad manager 200 can provide the same advertisement to both the first client device 106a and the second client device 106e.

Additionally or alternatively, the ad manager 200 can provide advertisements of different types to the client devices. In particular, the ad manager 200 can determine types of advertisements to provide to the client devices based on the type of streaming content at each client device. For example, the ad manager 200 can provide different types of advertisements from the same ad campaign, including video, audio, text, image or other advertisement types. To illustrate, the ad manager 200 can provide a video advertisement to a client device streaming video content and an audio advertisement to a client device streaming audio content.

In one or more additional or alternative embodiments, the ad manager 200 can provide advertisements/information to client devices based on other data associated with the client devices, even if the client devices are not assigned to an age profile 302. For example, the ad manager 200 can provide targeted advertisements based on content that is streaming to a client device. To illustrate, the ad manager 200 can determine that the client device or another client device with the same concurrent user ID (e.g., associated with the same account) is presently receiving streaming content from the content provider 104, based on the streaming content, the ad manager can determine one or more advertisements to provide to the client device in association with the content.

According to one or more embodiments, the ad manager 200 can provide the advertisement to a client device by way of the content provider 104. Specifically, the ad manager 200 can provide the advertisement to the content provider 104 to allow the content provider 104 to insert the advertisement into the streaming content. For example, the ad manager 200 can detect an ad call by the client device, select the advertisement based on one or more of the criteria described above, and provide the advertisement to the content provider 104.

In one or more embodiments, by providing the advertisement to the content provider 104, the content provider 104 can provide the advertisement seamlessly with the content. Specifically, the content provider 104 can insert the advertisement into the content stream to the client device at runtime. When the client device views the advertisement, the client device can view the advertisement without a pause that is typically associated with advertisements in streaming content. Additionally, providing the advertisements seamlessly with the content can provide an advertisement experience similar to a television advertisement experience.

In one or more alternative embodiments, the ad manager 200 can provide the advertisement directly to the client device. In particular, the ad manager 200 can provide the advertisement to the client device in response to an ad call by the client device. To illustrate, the content streaming application or application plug-in can identify an advertisement break associated with the streaming content and send the ad call to the content provider 104 and/or the ad manager 200. The ad manager 200 can detect the ad call, select an advertisement, and provide the advertisement to the client device.

Figure 4A:
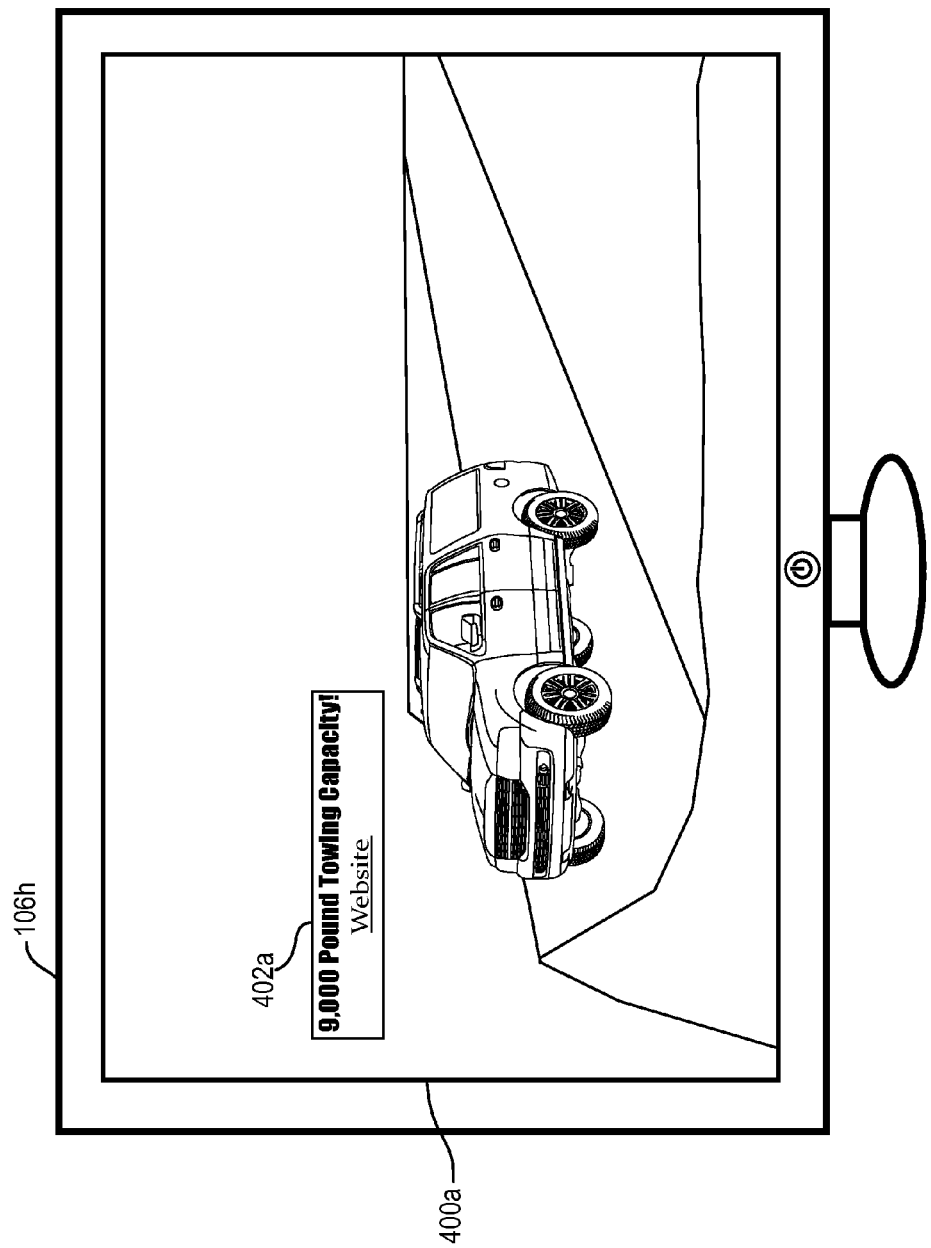
Figure 4B:
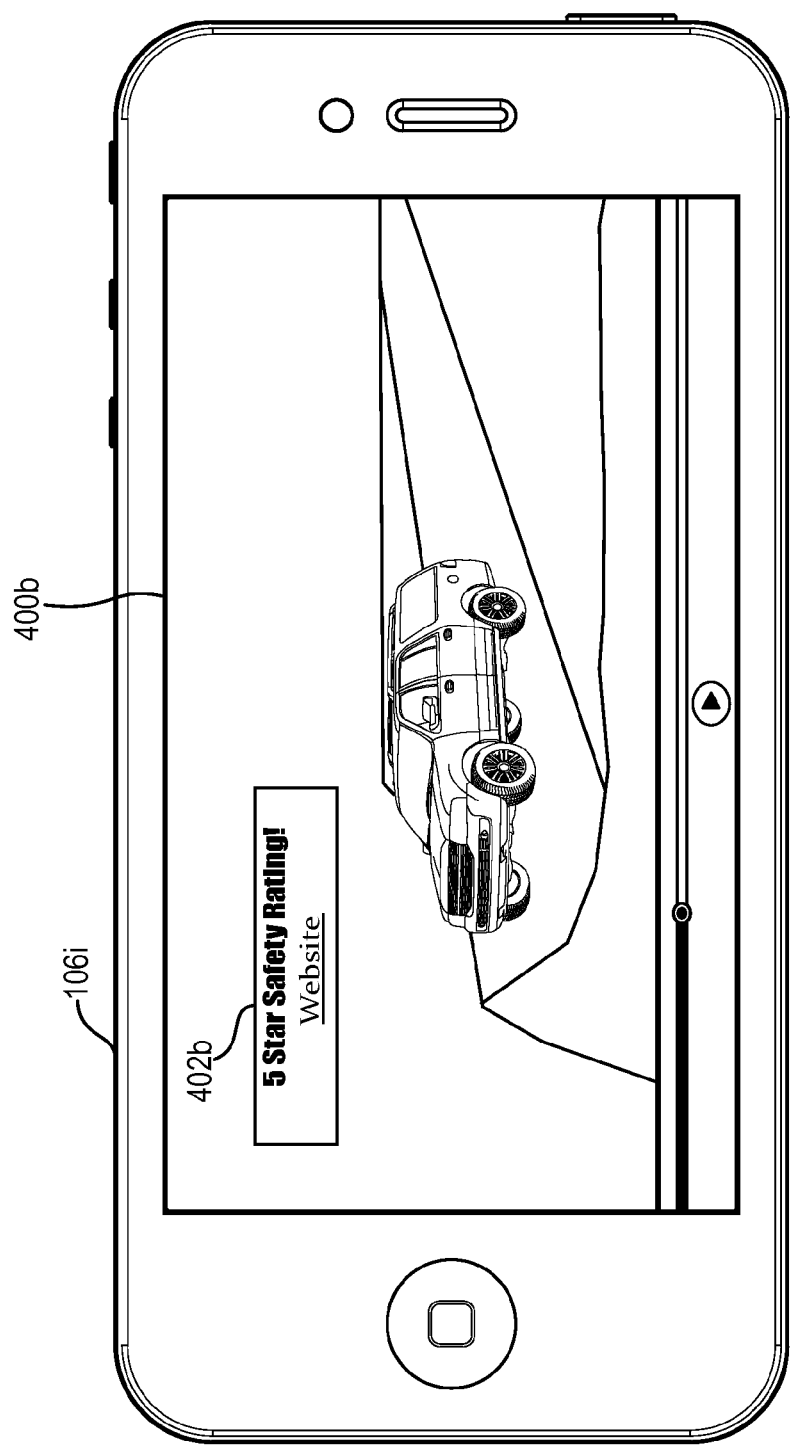

As described above, the ad management system 102 can associate a group of client devices with a concurrent user ID to form a close-knit group. FIGS. 4A-4C illustrate schematic diagrams of embodiments of a plurality of client devices of a close-knit group identified based on common user of a concurrent user ID. Specifically, the client devices 106h-106j of FIGS. 4A-4C can stream content using a concurrent streaming account. Although FIGS. 4A-4C illustrate a specific number and certain types of client devices 106*h*-106*j*, the content provider 104 can provide content to other numbers and other types of client devices 106*h*-106*j* based on the capability of the content provider 104 and the compatibility of the client devices 106*h*-106*j*.

In one or more embodiments, the ad management system 102 can determine that the client devices 106*h*-106*j* are related to each other. Specifically, the ad management system 102 can determine that each of the client devices 106*h*-106*j* is streaming content or has streamed content from a content provider 104 using the same concurrent streaming account. For example, each of the client devices 106*h*-106*j* can be from a group of related users (e.g., a family or group of friends) sharing the concurrent streaming account. To illustrate, one or more users may use each of the client devices 106*h*-106*j* to access content by logging into the concurrent streaming account using the same authentication credentials (e.g., username and password).

According to one or more embodiments, the ad management system 102 can target advertisements to the users of each of the client devices 106*h*-106*j* based on the relationship between the users. For example, the ad management system 102 can identify a relationship between the users based on the user of a similar concurrent streaming account and/or information associated with the concurrent streaming account. To illustrate, the ad management system 102 can determine that the users are in a family or other close-knit group of people.

In one or more embodiments, the ad management system 102 can then target advertisements to the users. Specifically, the ad management system 102 can determine an advertisement and/or an ad campaign that is typically associated with the identified type of relationship. For example, the ad management system 102 can determine that families are frequently interested in one or more products, such as sport utility vehicles, home appliances, or certain home entertainment devices. The ad management system 102 can then select an advertisement for one of the identified products to provide to each of the related client devices 106*h*-106*j*. To illustrate, the ad management system 102 can select an advertisement 400*a*-400*c* for a sport utility vehicle to provide to each of the client devices 106*h*-106*j*, as shown in FIGS. 4A-4C.

In one or more embodiments, the ad management system 102 can provide the same advertisement to two or more of the related client devices 106*h*-106*j*. For example, the ad management system 102 can provide the same advertisement 400*a*-400*c* to two or more of the client devices 106*h*-106*j* that are concurrently streaming content using the concurrent streaming account. To illustrate, the ad management system 102 can determine that a first client device 106*h* e.g., a computer or a TV), a second client device 106*i* (e.g., a mobile telephone), and a third client device 106*j* (e.g., a tablet) are concurrently streaming content. The ad management system 102 can then provide the same (or a related) advertisement for a sport utility vehicle to each of the client devices 106*h*-106*j*. Additionally or alternatively, the ad management system 102 can provide the same advertisement to one or more of the client devices 106*h*-106*j* at different times if the client devices 106*h*-106*j* are not concurrently streaming content.

As discussed above, by serving the same or related advertisements to the users of a close-knit group, the ad management system 102 can foster interest of the users in the group in product or service. Furthermore, the ability to detect that the client devices 106*h*-106*j* are each concurrently streaming content at the same time, can allow the ad management system 102 to timely target the users of the close-knit group. For example, by providing the same advertisement to each of the users in the close-knit group at the same time or approximately at the same time (e.g., same day or same hour), the ad management system 102 can foster discussion among the group members about the advertisement.

In addition to the foregoing, the ad management system 102 can select advertisements to serve to the client devices 106*h*-106*j* based on the time and/or geographic location of the client devices. For example, if the ad management system 102 detects that several client devices of a close-knit group are concurrently streaming content around a mealtime, the ad management system 102 can serve the client devices of the close-knit group an advertisement for food.

In one or more embodiments, the ad management system 102 can provide targeted advertisements to the related client devices 106*h*-106*j* based on age profiles or other characteristics (e.g., an identified gender of the user) associated with the client devices 106*h*-106*j*. For example, in the embodiment shown in FIG. 4A, the first client device 106*h* includes a smart TV capable of streaming content of a first content type (e.g., "sports") from the content provider 104 according to interests associated with a first user of the first client device 106*h*. The ad management system 102 can identify the content type and assign an age profile associated with the first content type to the first client device 106*h*. Thus, the ad management system 102 can estimate the age of the first user based on the type of the streaming content. To illustrate, the ad management system 102 can estimate the age of the first user of the first client device 106*h* to be in the 40-50 age range.

After assigning an age profile to the first client device 106*h*, the ad management system 102 can provide advertisements to the first client device 106*h* while the first client device 106*h* streams content. In particular, the ad management system 102 can provide advertisements to the first client device 106*h* based on the assigned age profile 302. To illustrate, the ad management system 102 can provide an advertisement that targets users of ages 40-50 who are typically interested in sports content. Alternatively, the ad management system 102 can tailor or customize a targeted advertisement 400*a* based on the age or other profile of the user of the client device 106*h*.

In one or more embodiments, the ad management system 102 can provide additional information with the advertisement 400*a* based on the age profile of the first client device 106*h*. For example, the ad management system 102 can provide information about a product/feature of the advertisement 400*a* that may be interesting to the user of the first client device 106*h* based on the age profile of the client device. To illustrate, the ad management system 102 can analyze the advertisement 400*a* to identify metadata that includes information mapped to the age profile or to a specific content type of the streaming content. For instance, the ad management system 102 can determine that people interested in sports content are also frequently interested in information about mechanical features (e.g., towing capacity and engine specifications).

The ad management system 102 can then provide the information to the first client device 106*h* in association with the advertisement 400*a*. For example, the ad management system 102 can provide the information with the advertisement 400*a* or customize the advertisement 400*a* based on the information. To illustrate, the ad management system 102 can add an overlay 402*a* to the advertisement 400*a* to display the information based on the age profile of the client device. In one or more examples, the overlay 402a may include a banner or interactive content (e.g., a link) with additional information. The ad management system 102 can therefore provide targeted advertisements to the user by adding additional information (e.g., in an overlay 402) to an existing advertisement.

In additional or alternative embodiments, the ad management system 102 can select a pre-configured/pre-customized advertisement from an ad campaign in accordance with the age profile associated with the first client device 106h. Specifically, the ad management system 102 can identify an ad campaign for the product and select a pre-made advertisement focusing on specific features of the product. To illustrate, the ad management system 102 can identify an ad campaign for a sport utility vehicle and then select a pre-made advertisement that focuses on the mechanical features of the sport utility vehicle in accordance with the age profile associated with the first client device 106h. Thus, the ad management system 102 can provide targeted advertisements to the user with additional information that may be relevant to the first user by selecting pre-made advertisements associated with the age profiles of the users.

As described above, the ad management system 102 can determine that the first client device 106h is associated with one or more other client devices 106h-106j based on a concurrent streaming account used to stream content from the content provider 104 to other client devices 106h-106j. FIGS. 4B and 4C illustrate client devices 106h-106j that also stream content from the content provider 104 using the same concurrent streaming account as the first client device 106h.

In one or more embodiments, the second client device 106i includes a smartphone streaming content from the content provider 104. Specifically, the second client device 106i can stream content of a second content type (e.g., "romance") associated with interests of a second user. The ad management system 102 can identify the type of the streaming content, or of previously streamed content, and assign an age profile associated with the second content type (and the content types of the previously streamed content) to the second client device 106i. As such, the ad management system 102 can estimate the age of the second user based on the type of the content accessed at the second client device 106i. To illustrate, the ad management system 102 can estimate the age of the second user of the second client device 106i to be in the 30-40 age range.

According to one or more embodiments, the ad management system 102 can provide advertisements related to the advertisement 400a at the first client device 106h to the second client device 106i. In particular, the ad management system 102 can provide advertisements to the second client device 106i based on the age profile associated with the second client device 106i. For example, the ad management system 102 can provide an advertisement from the same ad campaign as the advertisement 400a at the first client device 106h. To illustrate, the ad management system 102 can first determine an ad campaign associated with the advertisement 400a at the first client device 106h and then identify any advertisements associated with the ad campaign. As described above, providing advertisements from the same ad campaign to a plurality of client devices 106h-106j streaming content using the same concurrent streaming account can provide the associated users with a discussion point for engaging in a conversation about the product in the advertisement.

Upon identifying the advertisements with the ad campaign, the ad management system 102 can select an advertisement from the ad campaign that corresponds to the age profile of the second client device 106i. Specifically, the ad management system 102 can use the age profile of the second client device 106i to select an advertisement from the ad campaign that best fits the common interests of users in the age group associated with the age profile 302. To illustrate, the ad management system 102 can select an advertisement 400b that highlights aspects of the sport utility vehicle that may interest the second user of the second client device 106i (e.g., the safety features of the vehicle) based on the corresponding age profile 302.

In one or more embodiments, the ad management system 102 can provide the information by modifying the original advertisement 400a to include the relevant information. For example, the ad management system 102 can modify the same advertisement 400a provided to the first client device 106h to include the relevant information in an overlay 402b on the advertisement 400b at the second client device 106i. To illustrate, the ad management system 102 can replace the overlay 402a including information about the towing capacity and engine specs in the advertisement 400a provided to the first client device 106h with an overlay 402b including information about the safety features. The ad management system 102 can then provide the customized advertisement 400b to the second client device 106i.

Additionally or alternatively, the ad management system 102 can provide a targeted advertisement 400b by selecting the targeted advertisement 400b from a pre-made set of advertisements in the ad campaign. Specifically, the ad management system 102 can provide the information based on the age profile of the second client device 106i by selecting a different version of the sports utility advertisement that highlights specific features tailored to the age profile of the second user/device. For example, the ad management system 102 can select a version of the advertisement 400b for the sport utility vehicle that focuses on the safety features of the vehicle, rather than the features shown in the advertisement 400a at the first client device 106h.

According to various embodiments, the ad management system 102 can provide the targeted advertisement 400b to the second client device 106i at an appropriate time. Specifically, the ad management system 102 can determine the appropriate time based on whether the second client device 106i is streaming content. For example, if the ad management system 102 is streaming content concurrently with the first client device 106h, the ad management system 102 can provide the advertisement 400b to the second client device 106i immediately. Alternatively, the ad management system 102 can provide the advertisement 400b during the next ad break at the second client device 106i. In another example, if the second client device 106i is not concurrently streaming content with the first client device 106h, the ad management system 102 can wait until the second client device 106i begins streaming content to provide the advertisement 400b.

FIG. 4C shows a third client device 106j using the same concurrent streaming account to access content from the content provider 104 as the client devices 106h, 106i. In one or more embodiments, the third client device 106j can include a tablet streaming content from the content provider 104. Specifically, the third client device 106j can stream content of a third content type (e.g., "animated") associated with the interests of the third user. For example, the third client device 106j may concurrently stream content with the first client device 106h and/or the second client device 106i. Alternatively, the third client device 106j may stream content while one or both of the second client device 106i and the third client device 106j are offline (i.e., not streaming content).

In one or more embodiments, the ad management system 102 can identify the types of current and previous streaming content at the third client device 106j for assigning an age profile associated with the types of the current and previous streaming content. Specifically, the ad management system 102 attempts to estimate the age of the third user based on the content type of the content accessed at the third client device 106j. For example, the ad management system 102 can estimate the age of the third user of the third client device 106j to be in the 13-19 age range.

According to one or more embodiments, the ad management system 102 can target advertisements for the third client device 106j based on the advertisements provided to the first client device 106h and/or the second client device 106i. In particular, the ad management system 102 can provide advertisements to the third client device 106j based on an age profile associated with the third client device 106j. For example, the ad management system 102 can provide an advertisement from the same ad campaign as the advertisements provided at the first client device 106h and the second client device 106i.

Upon identifying the advertisements with the ad campaign, the ad management system 102 can select an advertisement from the ad campaign that corresponds to the age profile of the third client device 106j. Specifically, the ad management system 102 can use the age profile of the third client device 106j to select an advertisement from the ad campaign that best fits common interests of users in the age group associated with the corresponding age profile. To illustrate, the ad management system 102 can select an advertisement 400c that highlights aspects of the sport utility vehicle that may interest the third user of the third client device 106j (e.g., the entertainment features of the vehicle).

In additional or alternative embodiments, the ad management system 102 can select and/or customize the advertisement 400c to provide to the third client device 106j based on features identified from the user engagements with the advertisements 400a, 400b by the first user and/or the second user. In particular, the ad management system 102 can provide the advertisement 400c to the third client device 106j in a way that indicates the features that the first user and/or second uses may have found interesting. To illustrate using the previously described examples, the ad management system 102 can highlight the towing/engine features (according to the first user's interests) and/or the safety features (according to the second user's interests) in addition to the entertainment features (according to the third user's interests).

According to one or more embodiments, the ad management system 102 can provide the targeted advertisement 400c by selecting the targeted advertisement 400c from a pre-made set of advertisements in the ad campaign. Specifically, the ad management system 102 can provide the information based on the age profile of the third client device 106j by selecting a version of the advertisement that highlights specific features of the same product in association with the corresponding age profile 302. For example, the ad management system 102 can select a version of the advertisement 400c for the sport utility vehicle that focuses on the entertainment features of the vehicle, rather than the features shown in the advertisements 400b, 400c at the first client device 106h and second client device 106i.

Additionally or alternatively, the ad management system 102 can provide the information by modifying the original advertisement 400a provided to the first client device 106h or another advertisement in the ad campaign to include the relevant information. For example, the ad management system 102 can modify the advertisements 400a, 400b provided to the first client device 106h and the second client device 106i to include the relevant information in an overlay 402c on the advertisement 400c at the third client device 106j. To illustrate, the ad management system 102 can provide an overlay 402c for the advertisement 400c including information about the entertainment features. The ad management system 102 can then provide the customized advertisement 400c to the third client device 106j.

According to various embodiments, the ad management system 102 can provide a targeted advertisement 400c to the third client device 106j at an appropriate time. Specifically, the ad management system 102 can determine the appropriate time based on whether the third client device 106j is streaming content. For example, if the ad management system 102 is streaming content concurrently with the first client device 106h and/or the second client device 106i, the ad management system 102 can provide the advertisement 400c to the third client device 106j immediately upon receiving an indication of user engagement from one or more other user client devices 106h-106j. Alternatively, the ad management system 102 can provide the advertisement 400c during the next ad break at the third client device 106j. In another example, if the third client device 106j is not concurrently streaming content with the first client device 106h, the ad management system 102 can wait until the third client device 106j begins streaming content to provide the advertisement 400c.

Although the ad management system 102 can provide the same advertisement to related client devices 106h-106j or targeted advertisements based on the age profiles associated with the related client devices 106h-106j, as mentioned above, the ad management system can additionally or alternatively provide customized advertisements based on user engagements with the advertisements. Specifically, the ad management system 102 can determine whether one or more users engage with advertisements at one or more client devices 106h-106j and provide targeted advertisements to one or more related client devices 106h-106j. For example, the ad management system 102 can detect a user engagement with an advertisement at a client device 106h and select advertisements to present to related client devices 106i-j based on the user engagement and/or information derived from the user engagement (e.g., type of engagement, features associated with the engagement).

For instance, the ad management system 102 can detect a user engagement with the advertisement 400a and send an indication of the user engagement to the ad management system 102. For example, a content streaming application, a plug-in for a content streaming application, or another client application at a client device 106h can determine a type of user engagement and/or other information associated with the user engagement. To illustrate with reference to FIGS. 4A-4C, the first client device 106h can detect if the first user pauses the advertisement 400a at a particular time position (e.g., when the advertisement 400a is displaying the towing capacity and engine specs). The first client device 106h can then generate an electronic message including the user engagement information and information associated with the advertisement 400a (or store the information in a cookie as described above) to send to the ad management system 102.

The ad management system 102 can use the user engagement information to determine which advertisement to provide to the second client device 106i and/or the third client device 106j. Specifically, the ad management system 102 can select an advertisement that provides a similar advertising experience to each of the client devices 106h-106j in response to detecting the user engagement. To illustrate, the ad management system 102 can identify interest in an advertisement by a user of a client device 106h and present the same advertisement to users of related client devices 106i-j to increase the likelihood of generating interest in a particular product among a plurality of users in a close-knit group.

In additional or alternative embodiments, upon receiving an indication or notification of the user engagement from the first client device 106h, the ad management system 102 can identify user engagement information and advertisement information from the indication. In particular, the ad management system 102 can identify the type of the user engagement, the advertisement 400a engaged, and a location or time of the user engagement with respect to the advertisement 400a. For example, the ad management system 102 can determine that the first user paused the advertisement 400a at the particular time position. The ad management system 102 can also determine that the time position is associated with the towing/engine features based on metadata associated with the advertisement 400a, as described previously.

In one or more embodiments, the ad management system 102 can determine content or features of the advertisement 400a associated with the user engagement. For example, an advertiser or other source of the advertisement 400a can provide a mapping of specific times and/or locations in the advertisement 400a that are associated with specific features of a product or service associated with the advertisement 400a. To illustrate, the advertiser can provide a lookup table that allows the ad management system 102 to find a specific feature by searching for the time and/or location of the user engagement in the lookup table and finding the corresponding feature of the advertisement 400a.

After identifying one or more features associated with the user engagement, the ad management system 102 can select and/or customize the advertisements 400b, 400c to provide to the second client device 106i and/or the third client device 106j based on the identified features. In particular, the ad management system 102 can provide the advertisements 400b, 400c to the second client device 106i and/or the third client device 106j in a way that indicates the features that the first user may have found interesting. To illustrate, using the previously described examples, the ad management system 102 can highlight the towing/engine features (according to the first user's interests).

In additional or alternative embodiments, the ad management system 102 can provide advertisements to a client device 106 based on user engagements with advertisements at two or more other related client devices 106h-106j. In particular, the ad management system 102 can determine that two users engaged with the same or similar advertisements at two related client devices 106h-i. Then the ad management system 102 can provide an advertisement to another related client device 106j based on the user engagements at the first two related client devices 106h-i. For example, the ad management system 102 can determine that the first user engaged with an advertisement at the first client device 106i and the second user engaged with an advertisement at the second client device 106i. The ad management system 102 can identify information associated with the user engagements at the first client device 106i and the second client device 106j and customize an advertisement for providing to the third client device 106j. To illustrate, if the user engagement of the first user is associated with the towing capacity features of the sport utility vehicle, and the user engagement of the second user is associated with the safety features of the sport utility vehicle, the ad management system 102 can customize the advertisement to the third client device 106j to highlight both the towing capacity and the safety features of the sport utility vehicle. In any event, the ad management system 102 can serve advertisements to client devices determined to be part of a close-knit group so as to increase the odds of the users discussing or purchasing a product or feature advertised.

FIGS. 1-4C, the corresponding text, and the examples, provide a number of different systems and devices for targeting advertisements to a close-knit group of users. In addition to the foregoing, embodiments can be described in terms of flowcharts comprising acts and steps in a method for accomplishing a particular result. For example, FIGS. 5 and 6 illustrate flowcharts of exemplary methods in accordance with one or more embodiments.

Figure 5:
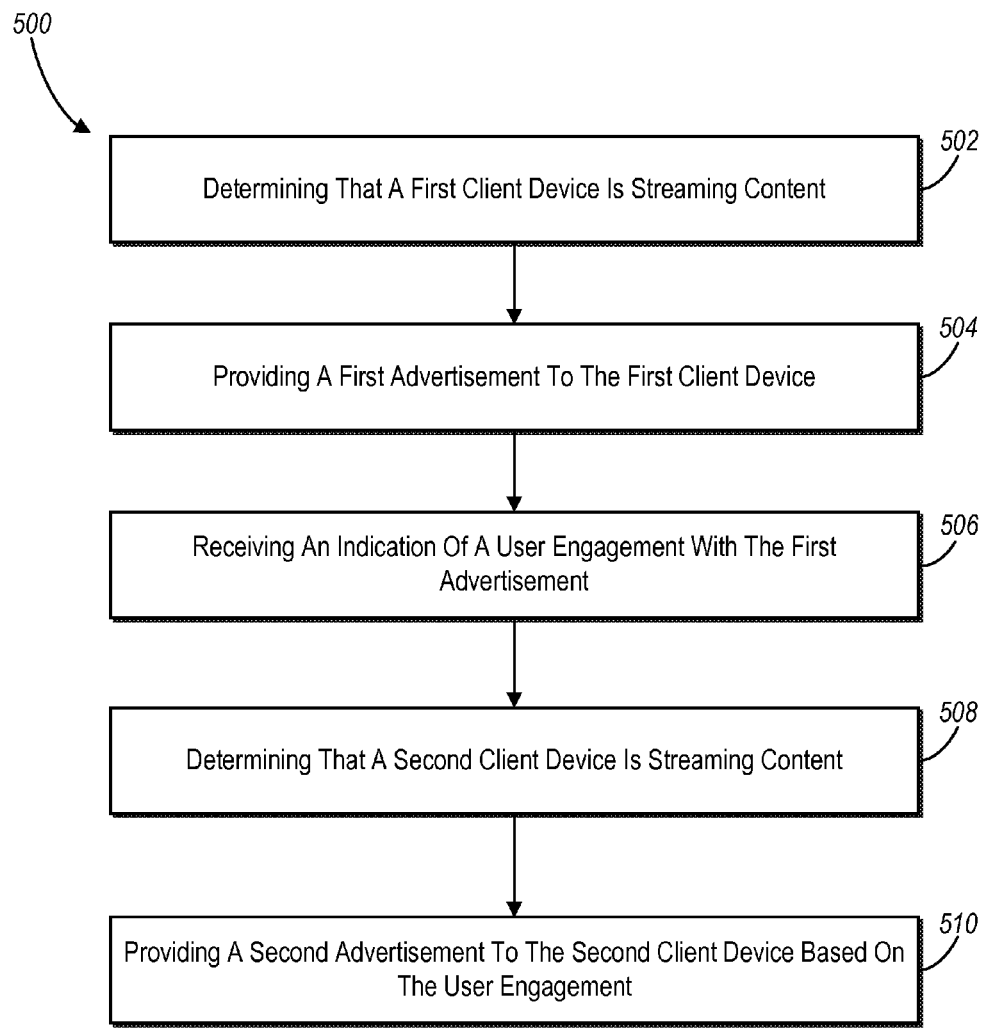
FIG. 5 illustrates a flowchart of a series of acts in a method of targeting advertisements to a close-knit group of users in accordance with one or more embodiments.
Figure 6:
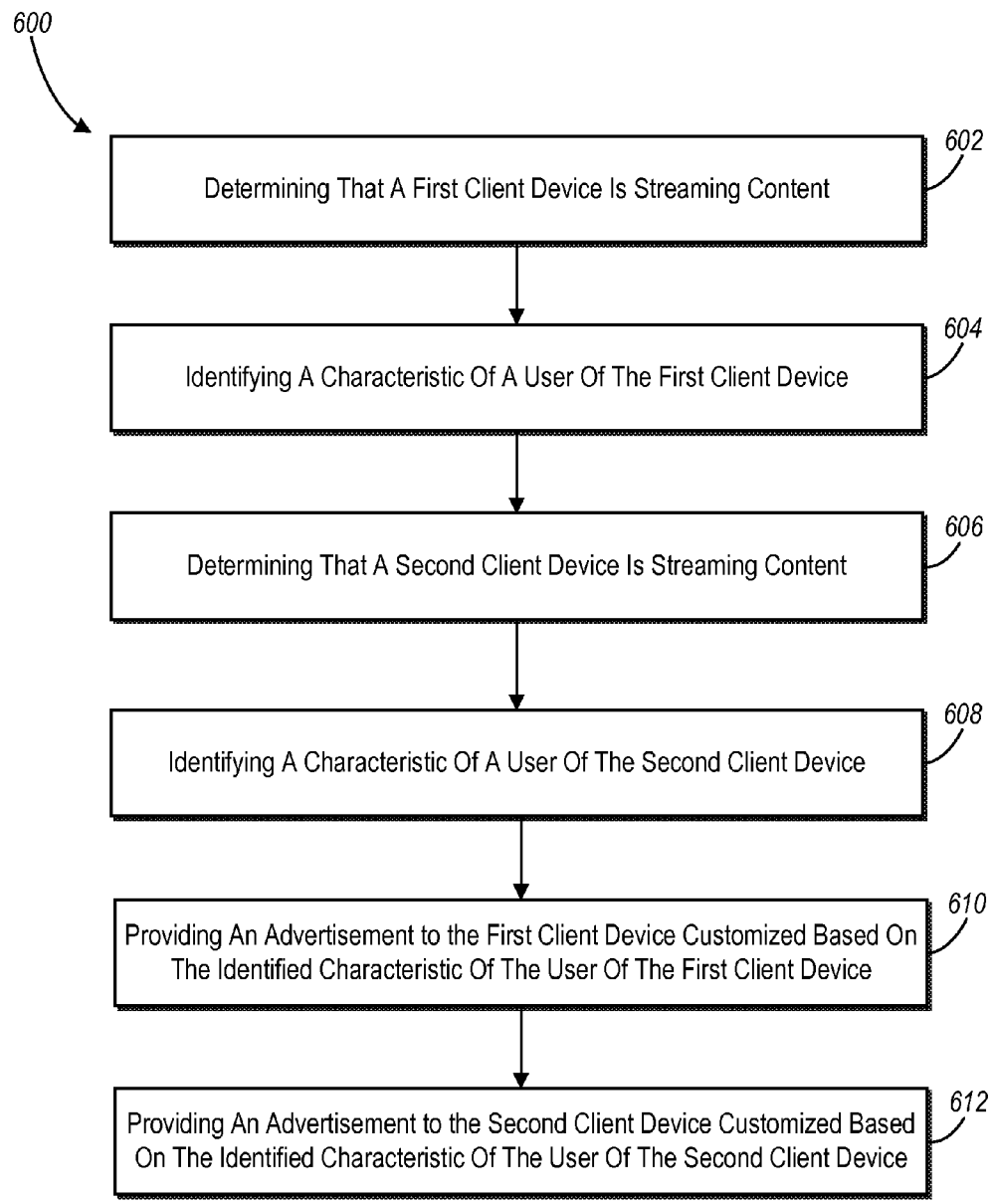
FIG. 6 illustrates a flowchart of a series of acts in another method of targeting advertisements to a close-knit group of users in accordance with one or more additional embodiments.

FIG. 5 illustrates a flowchart of a method 500 of targeting advertisements to a close-knit group of users. The method 500 includes an act 502 of determining that a first client device 106h is streaming content. For example, act 502 involves determining that a first client device 106h is streaming first content using a concurrent streaming account. To illustrate, act 502 can involve identifying the first client device 106h in association with the concurrent streaming account based on a device identifier of the first client device 106h and a concurrent user identifier. Additionally or alternatively, act 502 can involve mapping the device identifier and the concurrent user identifier to profile information for the first client device 106h.

The method 500 also includes an act 504 of providing a first advertisement to the first client device 106h. For example, act 504 involves providing a first advertisement of an ad campaign to the first client device 106h in association with the streaming first content. Act 504 can involve providing the first advertisement with the streaming content to the client device by providing the advertisement to the content provider 104. Alternatively, act 504 can involve providing the first advertisement directly to the first client device 106h.

As part of act 504, or as an additional act, the method 500 can include determining the first advertisement to provide to the first client device 106h based on a content type of the streaming content. For example, the method 500 can include selecting an advertisement based on interests commonly associated with the content type of the streaming content. To illustrate, the method 500 can include selecting the advertisement based on an estimated age, gender, and/or location of a user of the first client device 106h.

Additionally, the method 500 includes an act 506 of receiving an indication of a user engagement. For example, act 506 involves receiving, from the first client device 106h, an indication of a user engagement with the first advertisement at the first client device 106h. To illustrate, act 506 can include receiving an indication that the first client device 106h has interrupted playback of the first advertisement. For example, act 506 can involve identifying that the first client device 106h has paused playback, rewound playback, or restarted playback of the advertisement. Act 506 can also involve determining a type of user engagement and a feature of the first advertisement corresponding to the user engagement.

Alternatively, act 506 can involve detecting a selection of content presented with the first advertisement at the first client device 106h. For example, act 506 can include receiving detecting a selection of an interactive feature in the first advertisement (e.g., to select a specific color for a product)

or a selection of a user interface element provided with the first advertisement. To illustrate, act 506 can include detecting the selection of an element to display other content associated with the advertisement or an element to visit a website associated with the first advertisement.

The method 500 further includes an act 508 of determining that a second client device 106i is streaming content. For example, act 508 involves determining that a second client device 106i is streaming second content using the concurrent streaming account. To illustrate, act 508 can involve identifying the second client device 106i based on a device identifier in association with the concurrent streaming account. Act 508 can also involve determining that the first client device 106h and the second client device 106i are concurrently streaming content using the same concurrent streaming account.

The method 500 also includes an act 510 of providing a second advertisement to the second client device 106i. For example, act 510 involves providing a second advertisement of the ad campaign to the second client device 106i in association with the streaming second content in response to the received indication of the user engagement with the advertisement at the first client device 106h. To illustrate, act 510 can involve serving the same advertisement to both the first and second client devices (i.e., the second advertisement is the same as the first advertisement). Alternatively, act 510 can involve serving a related advertisement in the same ad campaign as the first advertisement to the second client device.

As part of act 510, or as an additional act, the method 500 can include identifying a characteristic for a user of the second client device 106i based on the content streamed to the second client device 106i. The method can then include customizing the second advertisement based on the identified characteristic. For example, identifying the characteristic of the user of the second client device 106i can involve determining an age profile 302b of the user of the second client device 106i based on the content streamed to the second client device 106i. Additionally, customizing the second advertisement can involve selecting a version of the second advertisement that highlights a feature likely to be appealing to users of the determined age profile 302b of the user of the second client device 106i. Alternatively, customizing the second advertisement can involve inserting a reference to a feature likely to be appealing to users of the determined age profile 302b of the user of the second client device 106i into the second advertisement.

Customizing the second advertisement can optionally involve highlighting an aspect of the second advertisement based on the identified characteristic. Additionally or alternatively, the method 500 can include generating information associated with the second advertisement based on the identified characteristic, and providing the generated information to the second client device 106i with the second advertisement. The method 500 can also include determining a device identifier (e.g., a unique device ID) for the second client device 106i, and mapping the identified characteristic to the second client device 106i.

As part of act 510, or as an additional act, the method 500 can include identifying a feature of the first advertisement likely of interest to the user of the first client device 106h. The method can then involve customizing the second advertisement based on the identified feature of the first advertisement likely of interest to the user of the first client device 106h. For example, the method can involve identifying a portion of the first advertisement corresponding to a user engagement with the first advertisement. The method can involve mapping the identified portion of the first advertisement corresponding to the user engagement to a feature of a product/service of the first advertisement. For example, the method can involve identifying a point in a timeline of the first advertisement at which the user of the first client device 106h engaged the advertisement. The method can then involve mapping the identified point of the first advertisement to the feature of the first advertisement by accessing a look-up table that indicates a particular feature corresponding to the point in the timeline.

Once the particular features is identified, the method can involve customizing the second advertisement by selecting a version of the second advertisement that highlights the identified feature of the first advertisement likely of interest to the user of the first client device 106h. Alternatively or additionally, the method can involve customizing the second advertisement by inserting a reference to the identified feature of the first advertisement likely of interest to the user of the first client device 106h.

FIG. 6 illustrates a flowchart of a method 600 of targeting advertisements to a close-knit group of users. The method 600 includes an act 602 of determining that a first client device 106h is streaming content. For example, act 602 involves determining that a first client device 106h is streaming content using a concurrent streaming account. To illustrate, act 602 can involve identifying a unique device ID for the first client device 106h in association with the concurrent streaming account. Additionally or alternatively, act 602 can involve mapping the unique device ID and a concurrent user identifier for the concurrent streaming account to profile information for the first client device 106h.

The method 600 further includes an act 604 of identifying a characteristic of a user of the first client device 106h. For example, act 604 can involve identifying an age profile 302a for a user of the first client device 106h. To illustrate, act 604 can involve estimating an age of the user of the first client device 106h based on the content viewed on the first client device 106h. For example, the method can involve estimating the age of the user by determining that users within a particular age range view the streaming content more frequently than users within other age ranges. Act 604 can also involve applying weights to different content types based on a disparity of use of the content types among different age ranges. Alternatively, act 604 can involve identifying a gender, location, or other characteristic of the user of the first client device 106h.

The method 600 also includes an act 606 of determining that a second client device 106i is streaming content. For example, act 606 involves determining that a second client device 106i is streaming content using the concurrent streaming account. To illustrate, act 606 can involve identifying a unique device ID for the second client device 106i in association with the concurrent streaming account. Act 606 can also involve determining that the first client device 106h and the second client device 106i are accessing content from the client provider using the same concurrent streaming account.

The method 600 further includes an act 608 of identifying a characteristic of a user of the second client device 106i. For example, act 608 can involve identifying an age profile 302b for a user of the second client device 106i. To illustrate, act 608 can involve estimating an age of the user of the second client device 106i based on content viewed on the second client device 106i. For example, act 608 can involve estimating the age of the user by determining that users within a particular age range view the streaming content more frequently than users within other age ranges. Act 608 can also involve applying weights to different content types based on a disparity of use of the content types among different age ranges. Additionally, act 608 can involve determining that an estimated age of the user of the first client device 106*h* is different from the estimated age of the user of the second client device 106*i*.

Act 608 can also involve receiving, from the second client device 106*i*, an indication of a user engagement with a first advertisement of an ad campaign provided to the second client device 106*i*. To illustrate, act 608 can involve receiving the indication from a client application at the client device. More specifically act 608 can involve receiving an indication that a playback of the first advertisement is interrupted at the client device. Additionally or alternatively, act 608 can involve receiving an indication of a selection of content or information associated with the first advertisement.

The method 600 also includes an act 610 of providing an advertisement to the first client device 106*h*. For example, act 610 involves providing an advertisement to the first client device 106*h* customized based on the age profile 302*a* for the user of the first client device 106*h*. Act 610 can involve selecting a version of the advertisement that highlights a feature likely to be appealing to users of the determined age profile 302*a* of the user of the first client device 106*h*. Act 610 can also involve seamlessly inserting the advertisement into the content streaming to the first client device 106*h*.

Alternatively, act 610 can involve inserting a reference to a feature likely to be appealing to users of the determined age profile 302*a* of the user of the first client device 106*h* into the advertisement. For example, act 610 can involve inserting a reference to the feature likely to be appealing to users of the determined age profile 302*a* of the user of the first client device 106*h* into the advertisement by adding an overlay 402*a* about the feature to the advertisement.

Additionally, the method 600 includes an act 612 of providing the advertisement to the second client device 106*i*. For example, act 612 involves providing an advertisement to the second client device 106*i* customized based on the age profile 302*b* for the user of the second client device 106*i*. For example, the method 600 can involve generating information for the advertisement based on one or more interests associated with the estimated age. To illustrate, the method 600 can include modifying the advertisement based on the identified age profile 302*b*. Alternatively, the method 600 can include selecting the advertisement from an ad campaign to highlight information associated with user engagements with the advertisement at one or more related client devices.

As part of act 612, or as an additional act, the method 600 can include determining that the first client device 106*h* is streaming content concurrently with the second client device 106*i*. For example, the method can involve receiving pings from a player of each of the first client device and the second client device indicating that each of the devices are currently streaming content. The method 600 can also include providing the advertisement to the first client device 106*h* and the second client device 106*i* while the first and second client devices 106*h*, 106*i* are concurrently streaming content.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
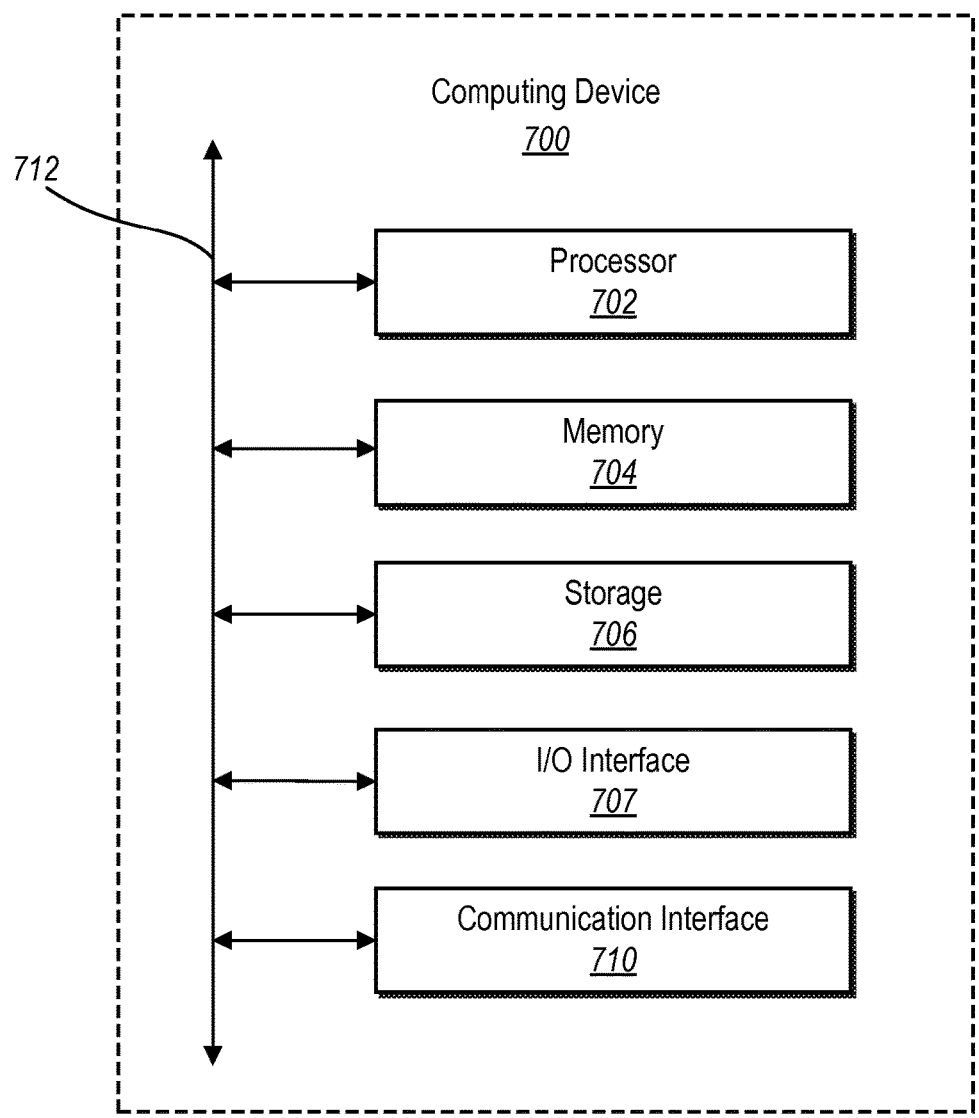
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the ad management system 102. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wirebased network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present disclosure is, therefore, indicated by the appended claims rather than by the foregoing description. All changes that come within the meaning and range of equivalency of the claims are to be embraced within their scope.

What is claimed is:

1. A method of targeting advertisements to a close-knit group of users, comprising:
   receiving, by one or more servers, a first ping from a first content player on a first client device;
   determining, by the one or more servers, that the first client device associated with a first user is streaming first content using a concurrent streaming account in response to receiving the first ping from the first client device;
   providing, by one or more servers, a first advertisement of an ad campaign to the first client device by integrating the first advertisement with a data stream of the streaming first content to the first client device;
   receiving, from the first client device, an indication of a user engagement by the first user with the first advertisement that is integrated with the data stream of the streaming first content at the first client device;
   detecting an interest of the first user in the first advertisement of the ad campaign based on the indication of the user engagement;
   receiving, by the one or more servers, a second ping from a second content player on a second client device;
   determining, by the one or more servers, that the second client device associated with a second user is streaming second content using the concurrent streaming account concurrently with the first client device in response to receiving the second ping from the second client device and receiving the first ping from the first client device;
   selecting, in response to the received indication and the detected interest of the first user, and based on the second client device streaming content using the concurrent streaming account, a second advertisement of the ad campaign for providing to the second user; and
   providing, by one or more servers, the second advertisement of the ad campaign to the second client device associated with the second user by integrating the second advertisement with a data stream of the streaming second content to the second client device in response to the received indication of the user engagement with the advertisement at the first client device.

2. The method as recited in claim 1, wherein the streaming second content and the streaming first content each comprise streams of live television.

3. The method as recited in claim 1, wherein integrating the first advertisement with the data stream of the streaming first content to the first client device comprises inserting the first advertisement into the data stream of the streaming first content based on an ad break cue associated with the data stream of the streaming first content.

4. The method as recited in claim 1, further comprising:
   identifying a characteristic of a user of the second client device based on content streamed to the second client device; and
   customizing the second advertisement based on the identified characteristic.

5. The method as recited in claim 4, wherein:
   identifying the characteristic of the user of the second client device based on the content streamed to the second client device comprises:
      determining an age profile of the user of the second client device based on the content streamed to the second client device; and mapping the age profile of the user of the second client device to a device identifier of the second client device; and customizing the second advertisement based on the identified characteristic comprises selecting a version of the second advertisement that highlights a feature likely to be appealing to users of the determined age profile of the user of the second client device.

6. The method as recited in claim 4, wherein:

identifying the characteristic of the user of the second client device based on the content streamed to the second client device comprises determining an age profile of the user of the second client device based on the content streamed to the second client device; and customizing the second advertisement based on the identified characteristic comprises inserting a reference to a feature likely to be appealing to users of the determined age profile of the user of the second client device into the second advertisement.

7. The method as recited in claim 1, further comprising:

identifying a feature of the first advertisement likely of interest to the first user of the first client device; and customizing the second advertisement based on the identified feature of the first advertisement likely of interest to the first user of the first client device.

8. The method as recited in claim 7, wherein identifying the feature of the first advertisement likely of interest to the user of the first client device comprises:

identifying a portion of the first advertisement corresponding to the user engagement by the first user; and mapping the identified portion of the first advertisement corresponding to the user engagement to a feature of the first advertisement.

9. The method as recited in claim 8, wherein identifying the portion of the first advertisement corresponding to the user engagement comprises one of:

identifying a point in a timeline of the first advertisement in which the first user of the first client device paused the first advertisement;

identifying a portion of a timeline of the first advertisement that the first user re-watched; or identifying a selectable option in the first advertisement selected by the first user of the first client device.

10. The method as recited in claim 9, wherein mapping the identified portion of the first advertisement to the feature of the first advertisement comprises accessing a look-up table that indicates a particular feature corresponding to the point in the timeline, a particular feature corresponding to the portion of the timeline, or a particular feature corresponding to the selectable option.

11. The method as recited in claim 7, wherein customizing the second advertisement based on the identified feature of the first advertisement likely of interest to the first user of the first client device comprise one or more of:

selecting a version of the second advertisement that highlights the identified feature of the first advertisement likely of interest to the first user of the first client device; or inserting, into the second advertisement, a reference to the identified feature of the first advertisement likely of interest to the first user of the first client device.

12. A system for targeting advertisements to a close-knit group of users, comprising:

at least one processor;

at least one non-transitory computer readable storage medium storing instructions thereon, that, when executed by the at least one processor, cause the system to:

receive a first ping from a first content player on a first client device;

determine that the first client device associated with a first user is streaming content using a concurrent streaming account in response to receiving the first ping from the first client device;

provide an advertisement to the first client device by integrating the advertisement with a data stream of the streaming content;

receive, from the first client device, an indication of a user engagement by the first user with the advertisement that is integrated with the data stream of the streaming content at the first client device;

detect an interest of the first user in the advertisement of an ad campaign based on the indication of the user engagement;

receive a second ping from a second content player on a second client device;

determine that the second client device associated with a second user is streaming content using the concurrent streaming account concurrently with the first client device in response to receiving the second ping from the second client device and receiving the first ping from the first client device;

customize, in response to the received indication and the detected interest of the first user, the advertisement to indicate the detected interest of the first user in the advertisement; and provide, and based on the second client device streaming content using the concurrent streaming account, the customized advertisement to the second client device by integrating the customized advertisement with the streaming content to the second client device.

13. The system as recited in claim 12, further comprising instructions that when executed by the at least one processor, cause the system to:

identify a characteristic for a user of the second client device based on the streaming content associated with the second client device;

generate information associated with the advertisement based on the identified characteristic; and provide the generated information to the second client device with the customized advertisement.

14. A non-transitory computer readable storage medium comprising instructions that, when executed by at least one processor, cause a computer system to:

receive a first ping from a first content player on a first client device;

determine that the first client device associated with a first user is streaming first content using a concurrent streaming account in response to receiving the first ping from the first client device;

provide a first advertisement of an ad campaign to the first client device by integrating the advertisement with a data stream of the streaming first content;

receive, from the first client device, an indication of a user engagement by the first user with the first advertisement that is integrated with the data stream of the streaming first content at the first client device;

detect an interest of the first user in the first advertisement of the ad campaign based on the indication of the user engagement;

receive a second ping from a second content player on a second client device;

determine that the second client device associated with a second user is streaming second content using the concurrent streaming account concurrently with the first client device in response to receiving the second ping from the second client device and receiving the first ping from the first client device;

select, in response to the received indication and the detected interest of the first user, and based on the second client device streaming content using the concurrent streaming account, a second advertisement of the ad campaign for providing to the second user; and provide the second advertisement of the ad campaign to the second client device associated with the second user by integrating the second advertisement with a data stream of the streaming second content to the second client device in response to the received indication of the user engagement with the first advertisement at the first client device.

15. The non-transitory computer readable storage medium as recited in claim 14, wherein the streaming second content and the streaming first content each comprise streams of live television.

16. The non-transitory computer readable storage medium as recited in claim 14, further comprising instructions that, when executed by the at least one processor, cause the computer system to integrate the first advertisement with the data stream of the streaming first content to the first client device by causing the first client device to insert the first advertisement into the data stream of the streaming first content at a player of the first client device.

17. The non-transitory computer readable storage medium as recited in claim 14, further comprising instructions that, when executed by the at least one processor, cause the computer system to:

determining an age profile of the user of the second client device based on an age characteristic associated with the second content streamed to the second client device;

map the age profile of the user of the second client device to a device identifier of the second client device; and select the second advertisement from a plurality of advertisements of the ad campaign based on the determined age profile.

18. The non-transitory computer readable storage medium as recited in claim 17, further comprising instructions that, when executed by the at least one processor, cause the computer system to customize the second advertisement based on the determined age profile by inserting a reference to a feature likely to be appealing to users of the determined age profile of the user of the second client device into the second advertisement.

19. The non-transitory computer readable storage medium as recited in claim 18, further comprising instructions that, when executed by the at least one processor, cause the computer system to customize the second advertisement by inserting content into an overlay on the second advertisement, the inserted content describing the feature likely to be appealing to users of the determined age profile of the user of the second client device.

20. The non-transitory computer readable storage medium as recited in claim 17, further comprising instructions that, when executed by the at least one processor, cause the computer system to select the second advertisement from a plurality of advertisements of the ad campaign by selecting, from the ad campaign, an advertisement that is tailored to the age profile of the user of the second device, wherein the second advertisement is tailored to a different age profile than the first advertisement.

* * * * *